(12) United States Patent
Lin et al.

(10) Patent No.: US 11,612,268 B2
(45) Date of Patent: Mar. 28, 2023

(54) BEVERAGE BREWING APPARATUS

(71) Applicant: CENZ Automation Co. Ltd., New Taipei (TW)

(72) Inventors: Chang Hao Lin, Taipei (TW); Hsing-Hsien Chen, New Taipei (TW)

(73) Assignee: CENZ Automation Co. Ltd., New Taipei (TW)

(*) Notice: Subject to any disclaimer, the term of this patent is extended or adjusted under 35 U.S.C. 154(b) by 340 days.

(21) Appl. No.: 16/909,996

(22) Filed: Jun. 23, 2020

(65) Prior Publication Data

US 2021/0251415 A1 Aug. 19, 2021

(30) Foreign Application Priority Data

Feb. 19, 2020 (TW) ................................ 109105275

(51) Int. Cl.
*A47J 31/06* (2006.01)
*A23F 3/18* (2006.01)
(Continued)

(52) U.S. Cl.
CPC ............. *A47J 31/0673* (2013.01); *A23F 3/18* (2013.01); *A23F 5/262* (2013.01);
(Continued)

(58) Field of Classification Search
CPC .. A47J 31/0673; A47J 31/521; A47J 31/3695; A47J 31/407; A47J 31/4492;
(Continued)

(56) References Cited

U.S. PATENT DOCUMENTS 3,364,959 A * 1/1968 Hamilton ................. B67D 1/12
141/183
4,319,698 A * 3/1982 Tomiyama ............ G07F 13/065
62/400
(Continued)

FOREIGN PATENT DOCUMENTS

CN 1731947 2/2006
CN 102397008 4/2012
(Continued)

OTHER PUBLICATIONS

English Translation for CN 110537840 published Dec. 2019.*
(Continued)

*Primary Examiner* — Anthony J Weier
(74) *Attorney, Agent, or Firm* — JCIPRNET

(57) ABSTRACT

A beverage brewing apparatus including a brewing module, an ingredient providing module, a drink providing module and a control unit is provided. The brewing module is adapted to brew at least one drink and at least one ingredient in a beverage cup. The ingredient providing module is adapted to provide the at least one ingredient into the beverage cup. The drink providing module is adapted to provide the at least one drink into the beverage cup. The control unit is adapted to control the brewing module, the ingredient providing module and the drink providing module according to a brewing procedure corresponding to the at least one drink and the at least one ingredient.

14 Claims, 26 Drawing Sheets

(51) Int. Cl.
  *A23F 5/26*   (2006.01)
  *A47J 31/36*  (2006.01)
  *A47J 31/40*  (2006.01)
  *A47J 31/44*  (2006.01)
  *A47J 31/46*  (2006.01)
  *A47J 31/52*  (2006.01)
  *B65D 85/804* (2006.01)

(52) U.S. Cl.
  CPC ......... *A47J 31/3695* (2013.01); *A47J 31/407* (2013.01); *A47J 31/4492* (2013.01); *A47J 31/46* (2013.01); *A47J 31/521* (2018.08); *B65D 85/8043* (2013.01); *B65D 2203/06* (2013.01)

(58) Field of Classification Search
  CPC ........ A47J 31/46; A23F 3/18; B65D 85/8043; B65D 2203/06
  See application file for complete search history.

(56) References Cited

U.S. PATENT DOCUMENTS

| | | | | |
|---|---|---|---|---|
| 4,815,633 A * | 3/1989 | Kondo | ............. | A47J 31/40 221/96 |
| 4,978,032 A * | 12/1990 | Newman | ............. | G07F 13/10 221/121 |
| 6,053,359 A * | 4/2000 | Goulet | ............. | B65G 47/22 221/221 |
| 6,062,277 A * | 5/2000 | Seo | ............. | G07F 13/10 141/370 |
| 6,116,460 A * | 9/2000 | Kim | ............. | G07F 13/10 221/96 |
| 6,135,169 A * | 10/2000 | Sandei | ............. | G07F 13/065 141/168 |
| 10,314,426 B2 * | 6/2019 | Hulett | ............. | A47J 31/60 |
| 2004/0188517 A1 * | 9/2004 | Choi | ............. | G07F 13/065 235/381 |
| 2013/0180623 A1 * | 7/2013 | Colnago | ............. | G07F 13/10 141/174 |
| 2015/0033948 A1 * | 2/2015 | Lawson | ............. | A47J 31/007 99/289 R |
| 2017/0039797 A1 * | 2/2017 | Elmery | ............. | G07F 17/0071 |
| 2018/0344073 A1 * | 12/2018 | Hsu | ............. | A47J 31/41 |

FOREIGN PATENT DOCUMENTS

| | | |
|---|---|---|
| CN | 102631139 | 8/2012 |
| CN | 110537840 | 12/2019 |
| JP | 2016113188 | 6/2016 |
| TW | I568391 | 2/2017 |
| TW | I619456 | 4/2018 |
| TW | M583590 | 9/2019 |
| TW | 201940110 | 10/2019 |

OTHER PUBLICATIONS

TW 108206637 which is English Translation of application for TW M583590 published Sep. 2019.*
"Office Action of Taiwan Counterpart Application", dated Aug. 10, 2020, pp. 1-8.
"Office Action of China Counterpart Application", dated Aug. 5, 2022, p. 1-p. 7.

* cited by examiner

BEVERAGE BREWING APPARATUS

CROSS-REFERENCE TO RELATED APPLICATION

This application claims the priority benefit of Taiwan application serial no. 109105275, filed on Feb. 19, 2020. The entirety of the above-mentioned patent application is hereby incorporated by reference herein and made a part of this specification.

BACKGROUND

Technical Field

The disclosure relates to a beverage brewing apparatus, and particularly relates to an automated beverage brewing apparatus.

Description of Related Art

People nowadays like to drink beverages, especially freshly brewed beverages. The freshly brewed beverage is made by adding different solid raw materials such as fruit granules, etc., to a liquid raw material such as water, juice, tea, coffee, fresh milk, etc., according to customer's needs, and then the beverage maker manually mixes the raw materials well in a brewing cup by using different brewing methods such as shaking and stirring to obtain the freshly brewed beverage. An advantage of the freshly brewed beverages over traditional canned beverages is that customers may choose to add different solid raw materials to different liquid raw materials, and may use multiple brewing methods to brew the raw materials, which provides a variety of customized beverages for customers to choose, thus being popular among the public. Especially in summer, almost everyone has a cup of freshly brewed beverage, which shows its popularity.

However, compared to the canned beverages, which may be mass-produced automatically via an industrial process and refrigerated and cooled at selling places, the freshly brewed beverages require a considerable degree of manual operation skills due to a large variety of types and complicated procedures, and are not suitable for mass automatic brewing, and therefore the freshly brewed beverages cannot be compared with the canned drinks in terms of time and cost. Therefore, how to design an apparatus that is capable of automatically brewing the freshly brewed beverages while taking into consideration the space saving, sanitation, beverage flavor, and wide variety of beverage type is an important topic in the field of the freshly brewed beverages.

SUMMARY

The disclosure is directed to a beverage brewing apparatus, which is adapted to automatically brew beverage while taking space saving, sanitation, beverage flavor, and wide variety of beverage type into consideration.

The disclosure provides a beverage brewing apparatus including a brewing module, an ingredient providing module, a drink providing module and a control unit. The brewing module is adapted to brew at least one drink and at least one ingredient in a beverage cup. The ingredient providing module is adapted to provide the at least one ingredient into the beverage cup. The drink providing module is adapted to provide the at least one drink into the beverage cup. The control unit is adapted to control the brewing module, the ingredient providing module and the drink providing module according to a brewing procedure corresponding to the at least one drink and the at least one ingredient.

In an embodiment of the disclosure, the drink providing module includes a heat source device and an extraction space, the extraction space is adapted to contain at least one drink raw material, and the heat source device is adapted to provide hot water, steam or both of hot water and steam to extract the at least one drink raw material in the extraction space into the at least one drink.

In an embodiment of the disclosure, the at least one drink extracted from the at least one drink raw material includes at least one of tea and coffee.

In an embodiment of the disclosure, the drink providing module includes a drink raw material input port, the drink raw material input port is located on an outside of the beverage brewing apparatus, and the at least one drink raw material is adapted to be put into the extraction space through the drink raw material input port.

In an embodiment of the disclosure, the drink providing module includes at least one drink raw material container and an automatic supply element, the drink raw material container is adapted to contain the at least one drink raw material, and the automatic supply element is adapted to supply the at least one drink raw material in the drink raw material container to the extraction space in a quantitative and separate manner.

In an embodiment of the disclosure, the drink providing module includes at least one drink storage container, and the drink storage container is adapted to store the at least one drink.

In an embodiment of the disclosure, the at least one ingredient includes at least one solid ingredient, the ingredient providing module includes at least one solid ingredient supply unit, and the solid ingredient supply unit is adapted to supply the at least one solid ingredient into the beverage cup.

In an embodiment of the disclosure, the solid ingredient supply unit includes an ingredient package input port and an automatic cutting element, an ingredient package is adapted to be put into the solid ingredient supply unit through the ingredient package input port, and the automatic cutting element is adapted to cut the ingredient package so that the at least one solid ingredient in the ingredient package is adapted to be moved from the ingredient package to the beverage cup.

In an embodiment of the disclosure, the ingredient providing module includes a heat-preserving device, the heat-preserving device is adapted to contain a plurality of ingredient packages, and each of the ingredient packages contain the at least one solid ingredient.

In an embodiment of the disclosure, the beverage brewing apparatus includes a beverage cup supply module, wherein the beverage cup supply module is adapted to load a plurality of beverage cups, and adapted to move the beverage cups to the brewing module one by one.

In an embodiment of the disclosure, the beverage brewing apparatus includes a cleaning module, wherein the cleaning module is adapted to clean the brewing module and the ingredient providing module through at least one of hot water, steam and disinfectant.

In an embodiment of the disclosure, the beverage brewing apparatus has an opening and a beverage cup placing and taking-out area, the opening is located on an outside of the beverage brewing apparatus, the beverage cup placing and taking-out area is located inside the opening, and the brewing module is adapted to brew the at least one ingredient and the at least one drink in the beverage cup at the beverage cup placing and taking-out area, and the beverage cup is adapted to be taken out from the beverage cup placing and taking-out area through the opening.

In an embodiment of the disclosure, the beverage brewing apparatus includes a beverage cup supply module, wherein the beverage cup supply module is adapted to load a plurality of the beverage cups, and adapted to move the beverage cups to the beverage cup placing and taking-out area one by one.

In an embodiment of the disclosure, the brewing module includes a cover device and a shaking mechanism located at the beverage cup placing and taking-out area, the cover device is adapted to cover an opening of the beverage cup, and the shaking mechanism is adapted to shake the beverage cup.

In an embodiment of the disclosure, the brewing module includes a stirring device located at the beverage cup placing and taking-out area, and the stirring device is adapted to be extended into the beverage cup and stir the at least one ingredient and the at least one drink in the beverage cup.

According to the above description, the beverage brewing apparatus of the disclosure directly provides drinks and ingredients into the beverage cup, and directly performs a brewing procedure such as shaking, stirring, etc., on the beverage cup and the drinks and ingredients therein, so that there is no need to additionally set a relay brewing cup and additionally set a mechanism or assembly for transferring the beverage in the brewing cup to the beverage cup, by which a volume of the overall apparatus is reduced to achieve a space saving effect, and the apparatus is more suitable for selling places of various freshly brewed beverages. Moreover, since the beverage brewing apparatus of the disclosure omits the brewing cup and the related mechanism or assembly as described above, a chance of contact of the drinks and the ingredients with the apparatus is greatly reduced, so as to improve the degree of sanitation and make the overall apparatus easy to be cleaned.

DESCRIPTION OF THE EMBODIMENTS

Figure 1:
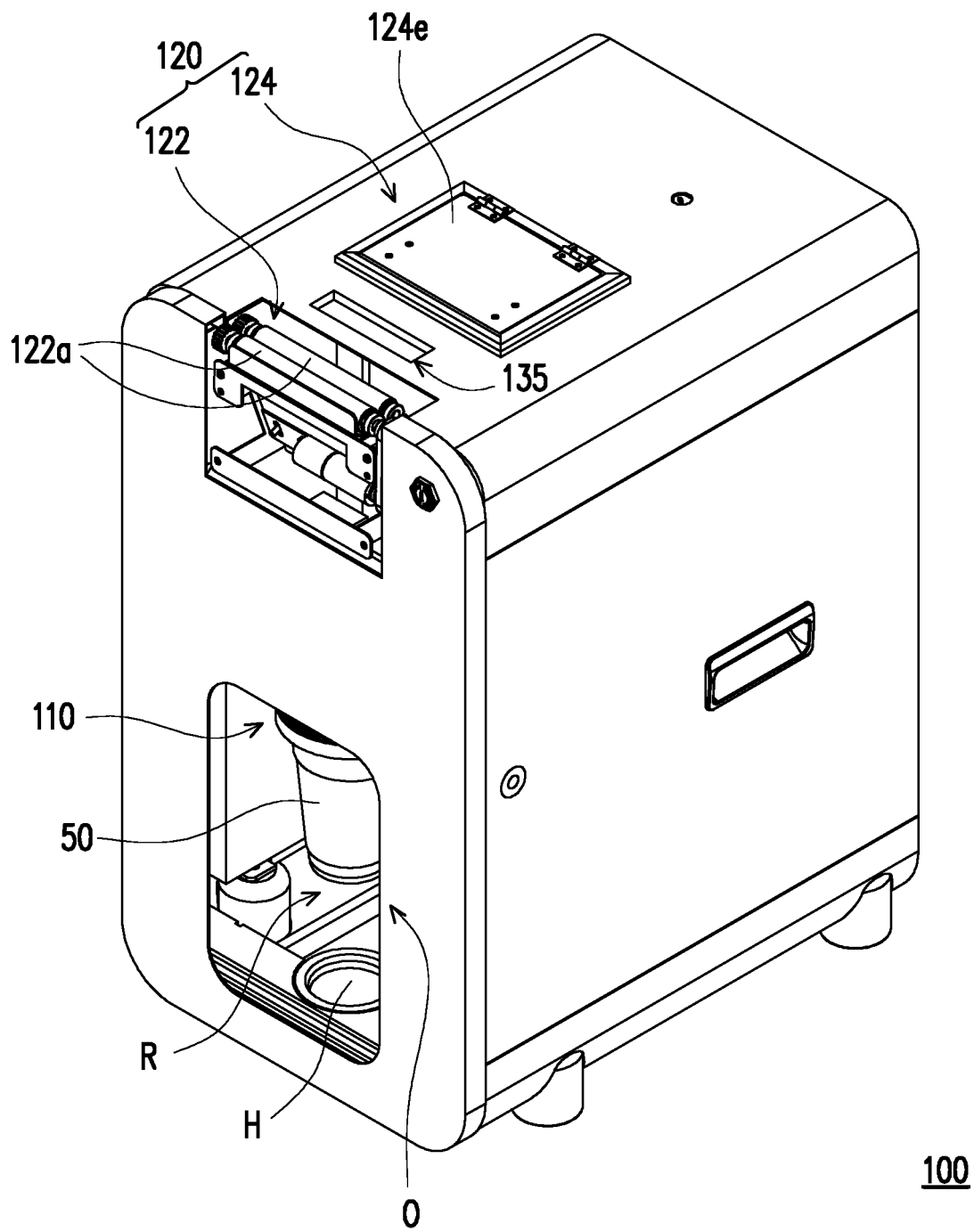
FIG. 1 is a three-dimensional view of a beverage brewing apparatus according to an embodiment of the disclosure.
Figure 2:
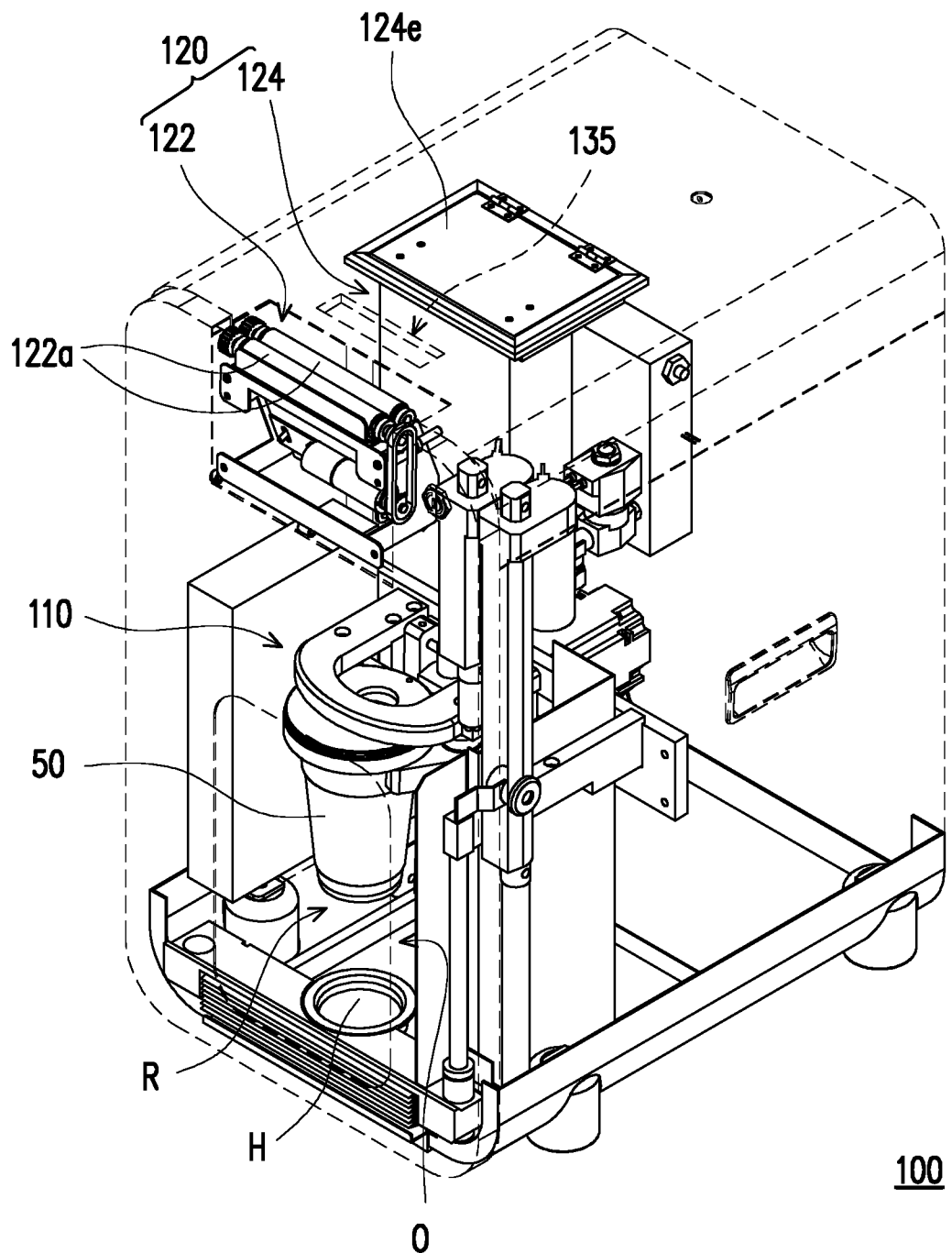
FIG. 2 is a perspective view of a part of components of the beverage brewing apparatus of FIG. 1.
Figure 3:
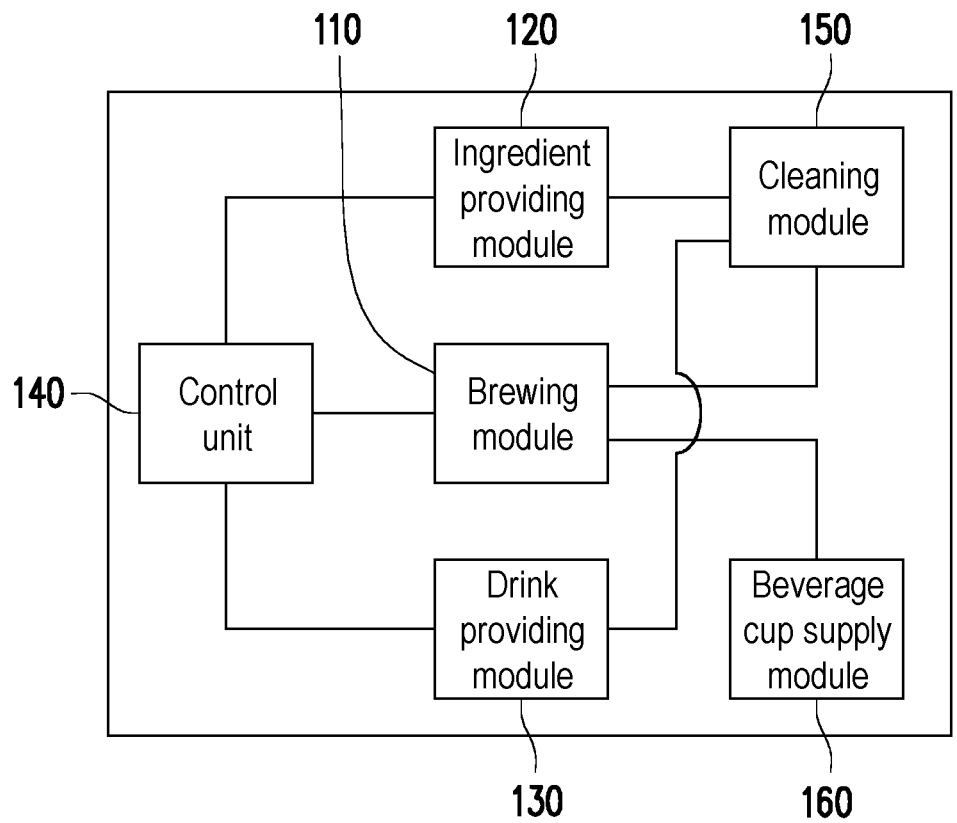
FIG. 3 is a schematic diagram of a part of components of the beverage brewing apparatus of FIG. 1.

FIG. 1 is a three-dimensional view of a beverage brewing apparatus according to an embodiment of the disclosure. FIG. 2 is a perspective view of a part of components of the beverage brewing apparatus of FIG. 1. FIG. 3 is a schematic diagram of a part of components of the beverage brewing apparatus of FIG. 1. Referring to FIG. 1 to FIG. 3, the beverage brewing apparatus 100 of the embodiment includes a brewing module 110, an ingredient providing module 120, a drink providing module 130 and a control unit 140.

The ingredient providing module 120 is adapted to provide an ingredient into a beverage cup 50, and the drink providing module 130 is adapted to provide a drink into the beverage cup 50, where the beverage cup 50 is a customer cup directly provided to a consumer. The drink is, for example, coffee, tea, or other types of drinks, and the ingredient may include pearls, coconut fruits, grass jelly, ice cubes, or other kinds of solid ingredients and fructose or other kinds of liquid ingredients, which is not limited by the disclosure. The brewing module 110 is adapted to brew the drink and the ingredient in the beverage cup 50. A user may select a corresponding brewing procedure through an operation interface of the beverage brewing apparatus 100 according to the drink and the ingredient. The control unit 140 is, for example, a control circuit inside the beverage brewing apparatus 100, and is adapted to control the brewing module 110, the ingredient providing module 120 and the drink providing module 130 to operate according to the corresponding brewing procedure based on an instruction input by the user through the operation interface.

Under the above configuration, the beverage brewing apparatus 100 directly provides the drink and the ingredient into the beverage cup 50, and directly performs the brewing procedure such as shaking, stirring, etc., to the beverage cup 50 and the drink and the ingredient therein, so that there is no need to additionally set a relay brewing cup and additionally set a mechanism or assembly for transferring the beverage in the brewing cup to the beverage cup 50, by which a volume of the overall apparatus is reduced to achieve a space saving effect, and the apparatus is more suitable for selling places of various freshly brewed drinks. Moreover, since the beverage brewing apparatus 100 of the disclosure omits the brewing cup and the related mechanism or assembly as described above, a chance of contact of the drink and the ingredient with the apparatus is greatly reduced, so as to improve a degree of sanitation and make the overall apparatus easy to be cleaned.

Referring to FIG. 3, the beverage brewing apparatus 100 of the embodiment further includes a cleaning module 150. The cleaning module 150 may include a steam boiler and a steam pipeline provided in the beverage brewing apparatus 100, and is adapted to clean the brewing module 110, the ingredient providing module 120 and the drink providing module 130 by using steam. In other embodiment, the cleaning module 150 may perform the cleaning by using hot water or disinfectant, which is not limited by the disclosure. Moreover, the beverage brewing apparatus 100 may further include a beverage cup supply module 160, the beverage cup supply module 160 may be located adjacent to the brewing module 110, and is adapted to load a plurality of beverage cups 50 and adapted to move the beverage cups 50 to the brewing module 110 one by one. In other embodiments, the beverage cup supply module 160 may not be provided, and the user may place the beverage cup 50 to the brewing module 110 through a beverage cup placing and taking-out area R by himself.

Figure 4:
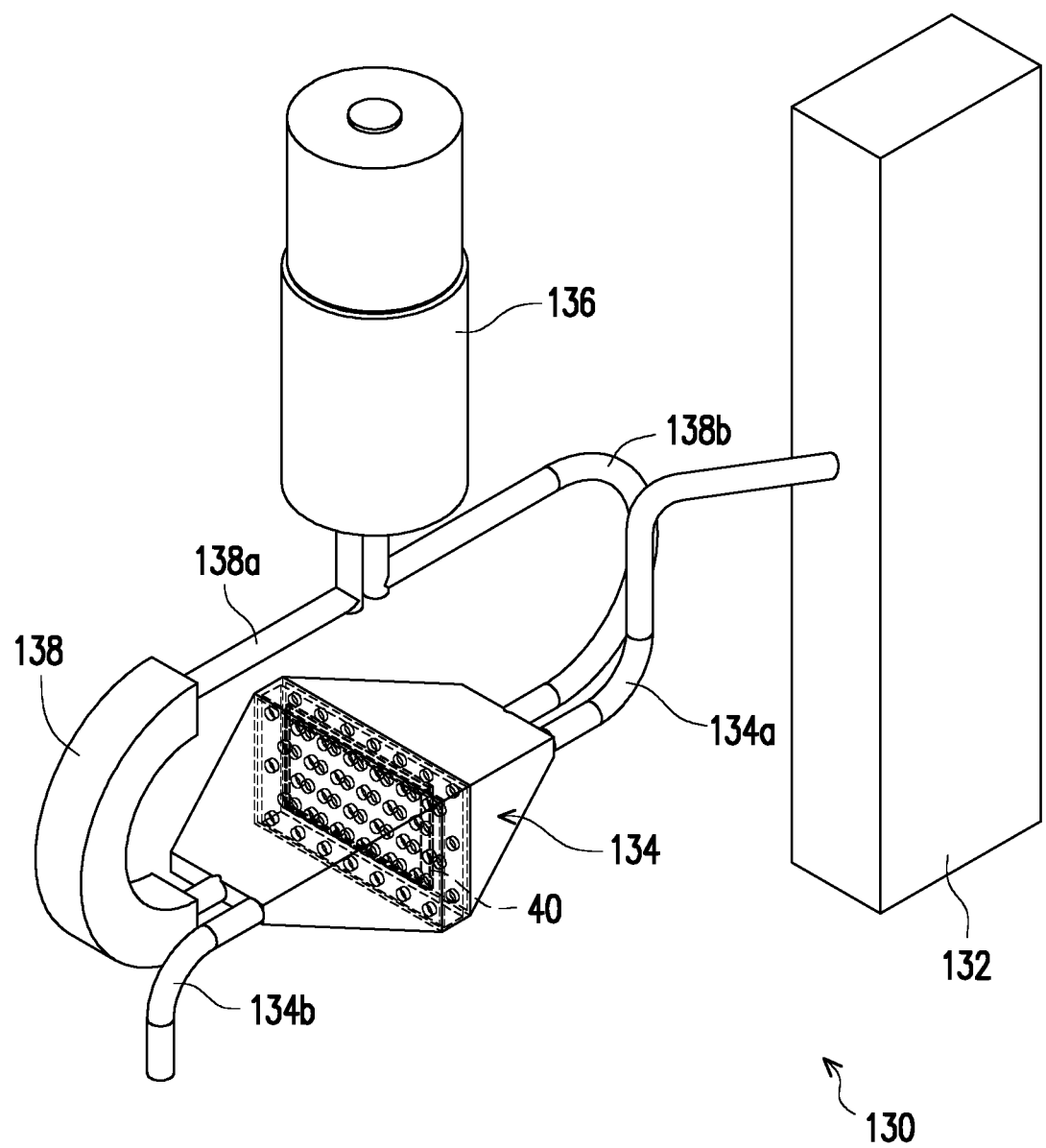
FIG. 4 is a three-dimensional view of a part of components of a drink providing module of FIG. 2.
Figure 5A:
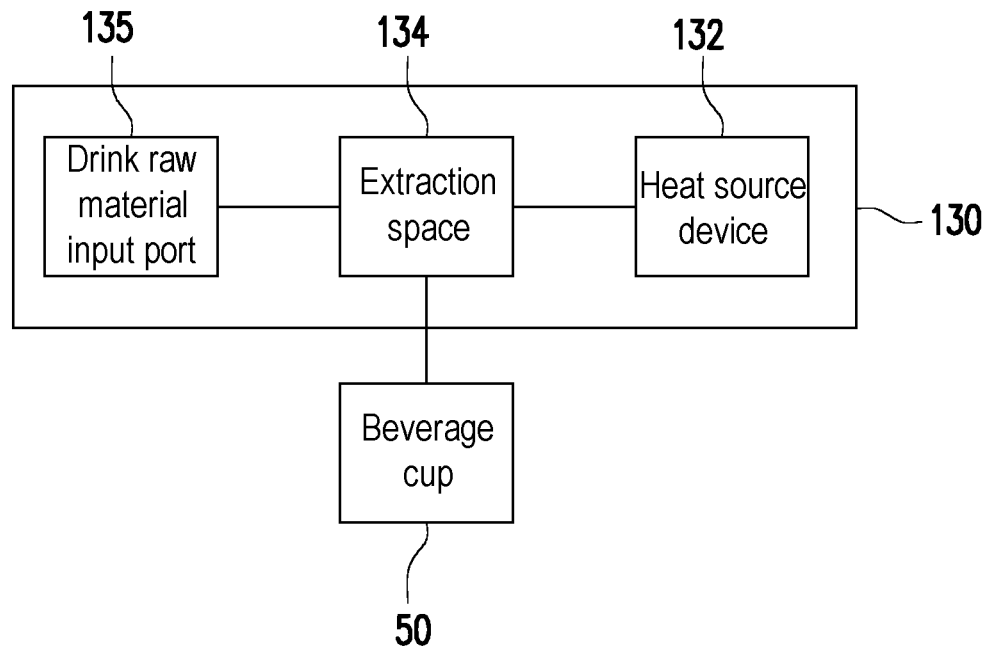
FIG. 5A is a schematic diagram of a part of components of the drink providing module of FIG. 2.

FIG. 4 is a three-dimensional view of a part of components of the drink providing module of FIG. 2. FIG. 5A is a schematic diagram of a part of components of the drink providing module of FIG. 2. For clarity's sake, the drink providing module 130 shown in FIG. 4 is not shown in FIG. 1 and FIG. 2, and it may be actually located below a drink raw material input port 135 of FIG. 1 and FIG. 2. Referring to FIG. 4 and FIG. 5A, the drink providing module 130 of the embodiment includes a heat source device 132, an extraction space 134 and the drink raw material input port 135. The drink raw material input port 135 is located on an outside of the beverage brewing apparatus 100, and the user may manually input a drink raw material 40 (such as a tea bag, tea leaves, a coffee bag, coffee powder, etc.) into the extraction space 134 in the drink providing module 130 through the drink raw material input port 135, and the extraction space 134 is adapted to contain the drink raw material 40. The drink raw material input port 135 may be an opening provided at an appropriate position on the outside of the beverage brewing apparatus 100, and the form thereof is not limited by the disclosure. The heat source device 132 may include a water heater, and is adapted to provide hot water to the extraction space 134 to extract the drink raw material in the extraction space 134 into a drink. In other embodiments, the heat source device 132 may include a steam boiler, and is adapted to provide steam to the extraction space 134 to extract the drink raw material in the extraction space 134 into a drink, which is not limited by the disclosure. In other embodiments, the heat source device 132 may include a boiler for hot water and steam and is adapted to provide hot water and steam to the extraction space 134 at the same time to extract the drink raw material in the extraction space 134 into a drink, which is also not limited by the disclosure. According to the above extraction method that the drink raw material 40 is manually put into the drink raw material input port 135 once each time, the type of the extracted drink is unlimited, for example, different kinds and qualities of tea leaves may be input to extract tea of different tastes and grades.

By configuring the heat source device 132, the drink providing module 130 may extract a drink such as tea or coffee, etc., freshly, and compared with pre-stored drinks, besides that the freshly extracted drink has a better flavor, the beverage brewing apparatus 100 is unnecessary to be additionally configured with a space for pre-storing the drinks, so that the volume of the overall apparatus may be further reduced without reducing selectivity of drink types due to the limited space for storing the drinks.

Figure 5B:
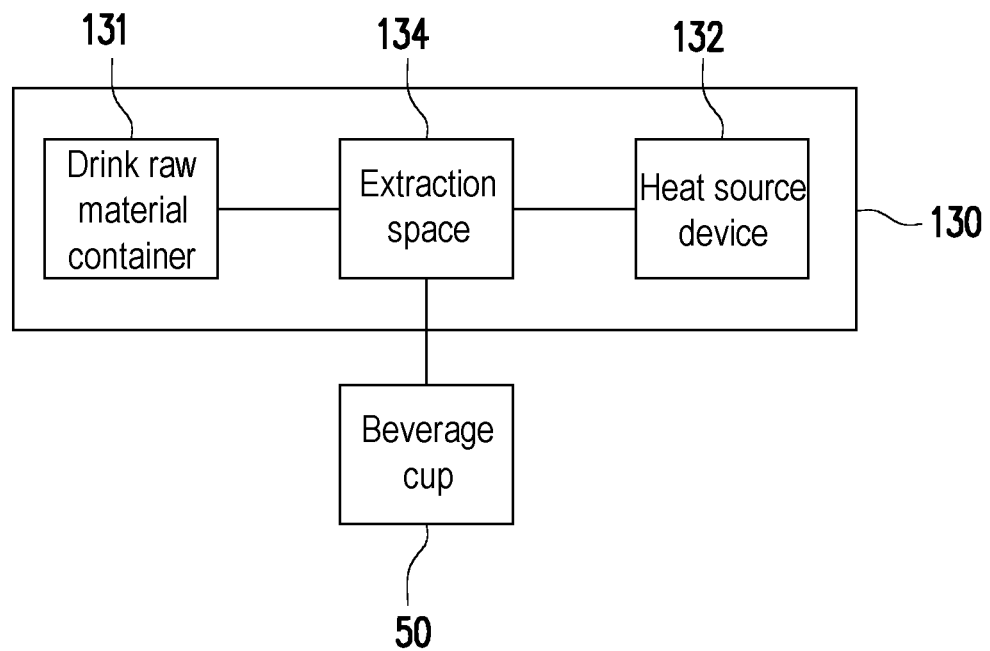
FIG. 5B is a schematic diagram of a part of components of a drink providing module according to another embodiment of the disclosure.

FIG. 5B is a schematic diagram of a part of components of a drink providing module according to another embodiment of the disclosure. A difference between the embodiment of FIG. 5B and the embodiment of FIG. 5A is that in the drink providing module 130 of FIG. 5B, a drink raw material container 131 is used to replace the drink raw material input port 135 of FIG. 5A. The drink raw material container 131 is adapted to contain the drink raw material 40. When it is required to extract tea, the drink raw material 40 in the drink raw material container 131 is provided to the extraction space 134. The drink raw material container 131 may be a single container or a plurality of containers, for example, three containers are included, and three different types of the drink raw material 40 may be stored. A main purpose of setting the drink raw material container 131 is to reduce a labor burden of manually putting a piece of the drink raw material 40 into the drink raw material input port 135 each time when a cup of drink is made.

The hot water coming from the heat source device 132 enters the extraction space 134 through a pipeline 134a shown in FIG. 4, and the extracted drink is guided into the beverage cup 50 (illustrated in FIG. 1 and FIG. 2) through the pipeline 134b.

Moreover, in order to control and maintain better temperatures required for extracting different drinks, the drink providing module 130 of the embodiment further includes a peristaltic pump 136 and a heating module 138, where the peristaltic pump 136 may drive the hot water in the extraction space 134 to flow by using pipelines 138a and 138b, so as to uniformly heat the drink raw material 40, and the heating module 138 is, for example, a heating coil or other suitable type of heating component, which is installed on the pipeline 138a to control a temperature of the hot water, so as to improve an extraction effect of the drink. In other embodiments, the peristaltic pump 136 and the heating module 138 may not be provided, or other method may be adopted to drive the hot water and perform temperature control, which is not limited by the disclosure. Moreover, the form of the extraction space 134 is not limited by the disclosure, which is described below with reference to the drawings.

Figure 6:
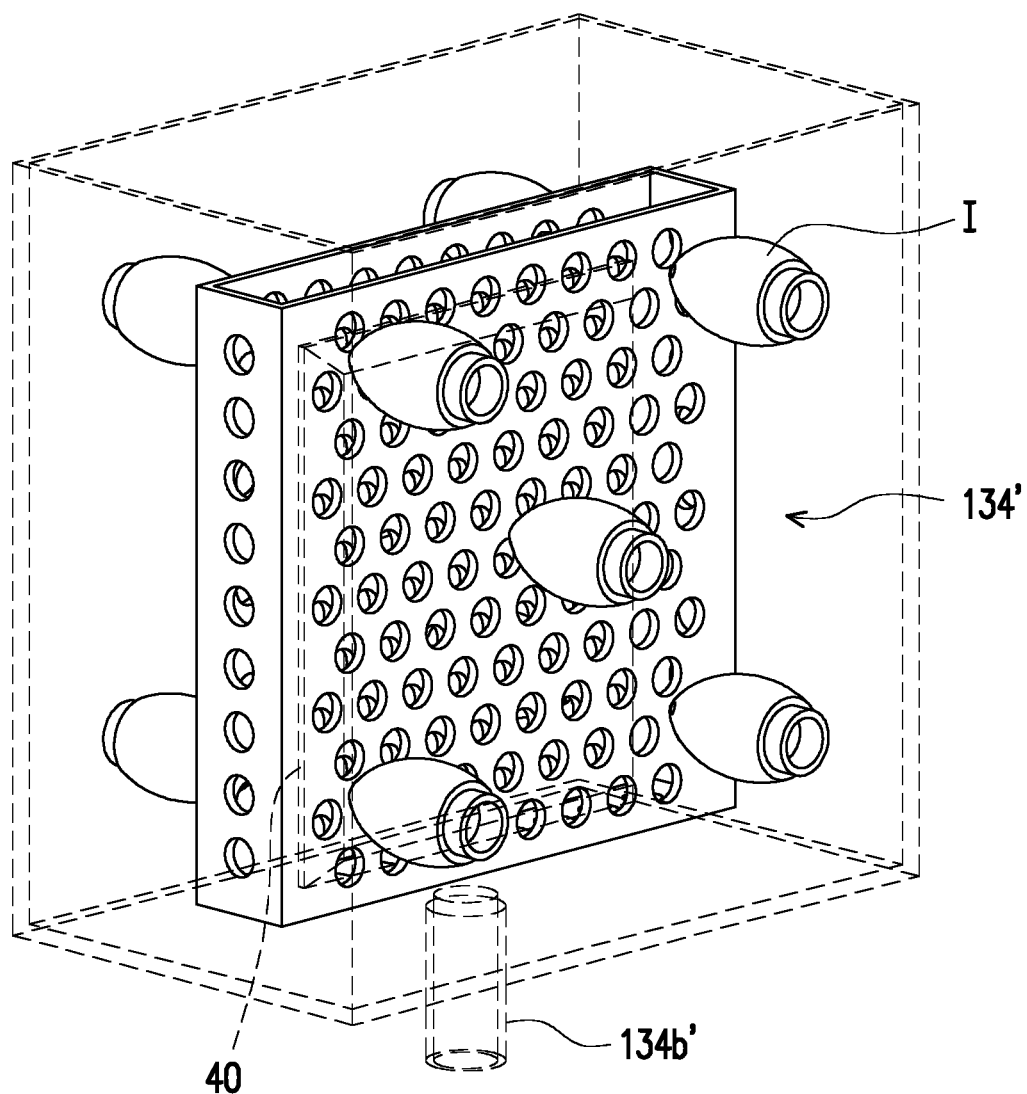
FIG. 6 is a three-dimensional view of a part of components of a drink providing module according to another embodiment of the disclosure.

FIG. 6 is a three-dimensional view of a part of components of a drink providing module according to another embodiment of the disclosure. A difference between the embodiment of FIG. 6 and the embodiment of FIG. 4 is that the hot water enters an extraction space 134' through a plurality of inlets I (for example, gas nozzles) located at two opposite sides of the extraction space 134', so as to uniformly heat the drink raw material 40 in the extraction space 134'. The extracted drink is guided to the beverage cup 50 through a pipeline 134b'.

Figure 7:
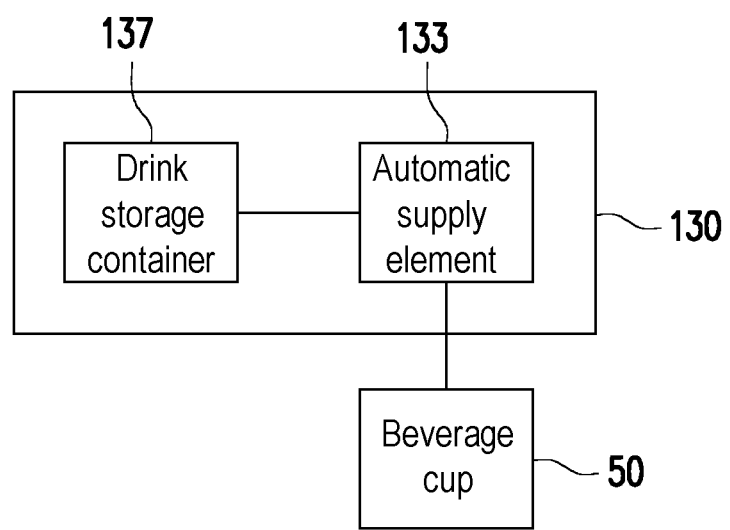
FIG. 7 is a schematic diagram of a part of components of a drink providing module according to another embodiment of the disclosure.

FIG. 7 is a schematic diagram of a part of components of a drink providing module according to another embodiment of the disclosure. In the embodiment of FIG. 7, the drink providing module 130 may provide a drink in a manner other than extraction, but includes at least one drink storage container 137 and an automatic supply element 133, where the drink storage container 137 is adapted to store a ready-made drink (such as coffee or tea), and may supply the drink to the beverage cup 50. The automatic supply element 133 is adapted to provide the drink in the drink storage container 137 to the beverage cup 50 in a quantitative and separate manner. The automatic supply element 133 is, for example, an automated quantitative supply mechanism, and the specific form thereof is not limited by the disclosure.

Figure 8A:
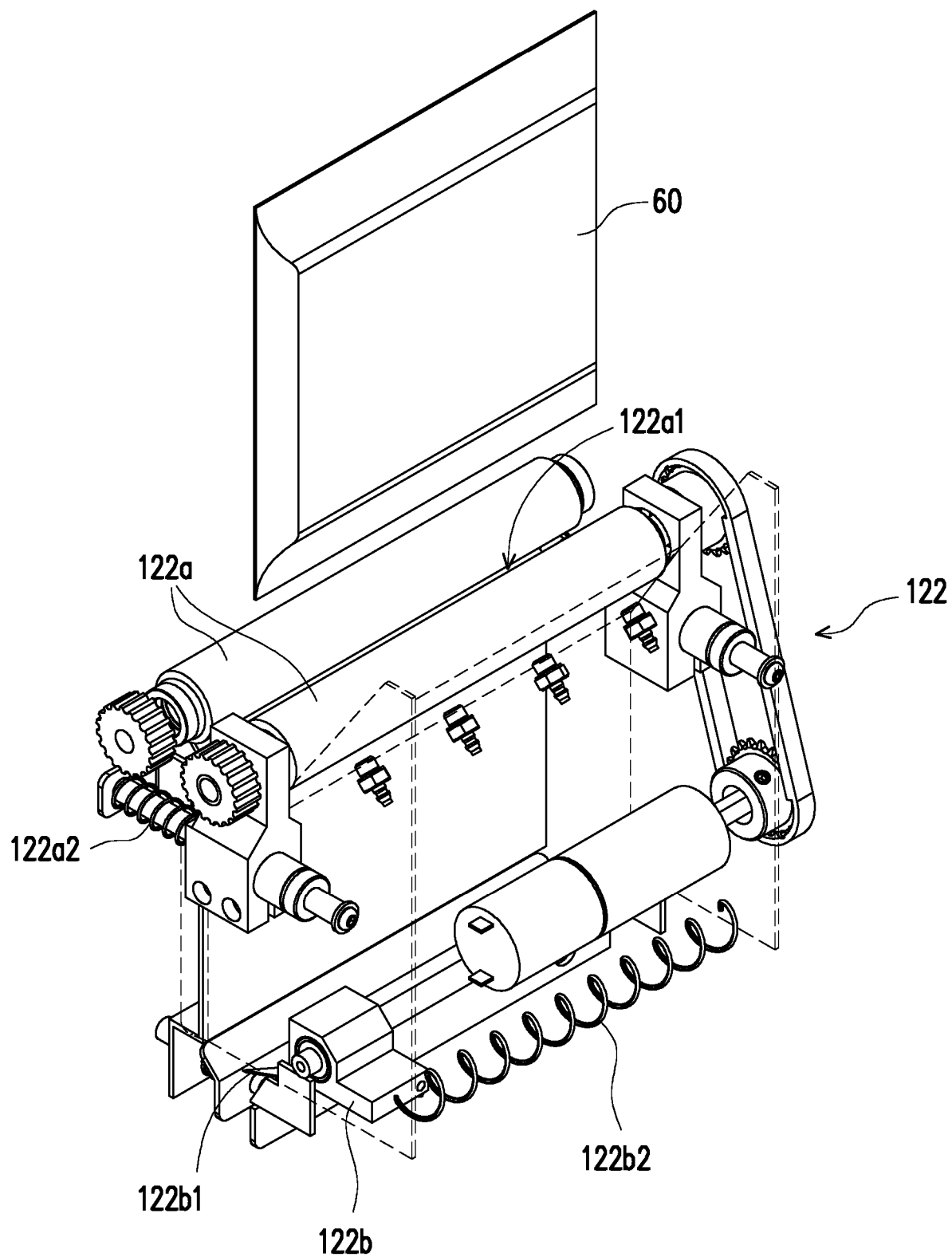
FIG. 8A, FIG. 8B, and FIG. 8C illustrate an operation flow of a part of components of an ingredient providing module of FIG. 2.
Figure 8B:
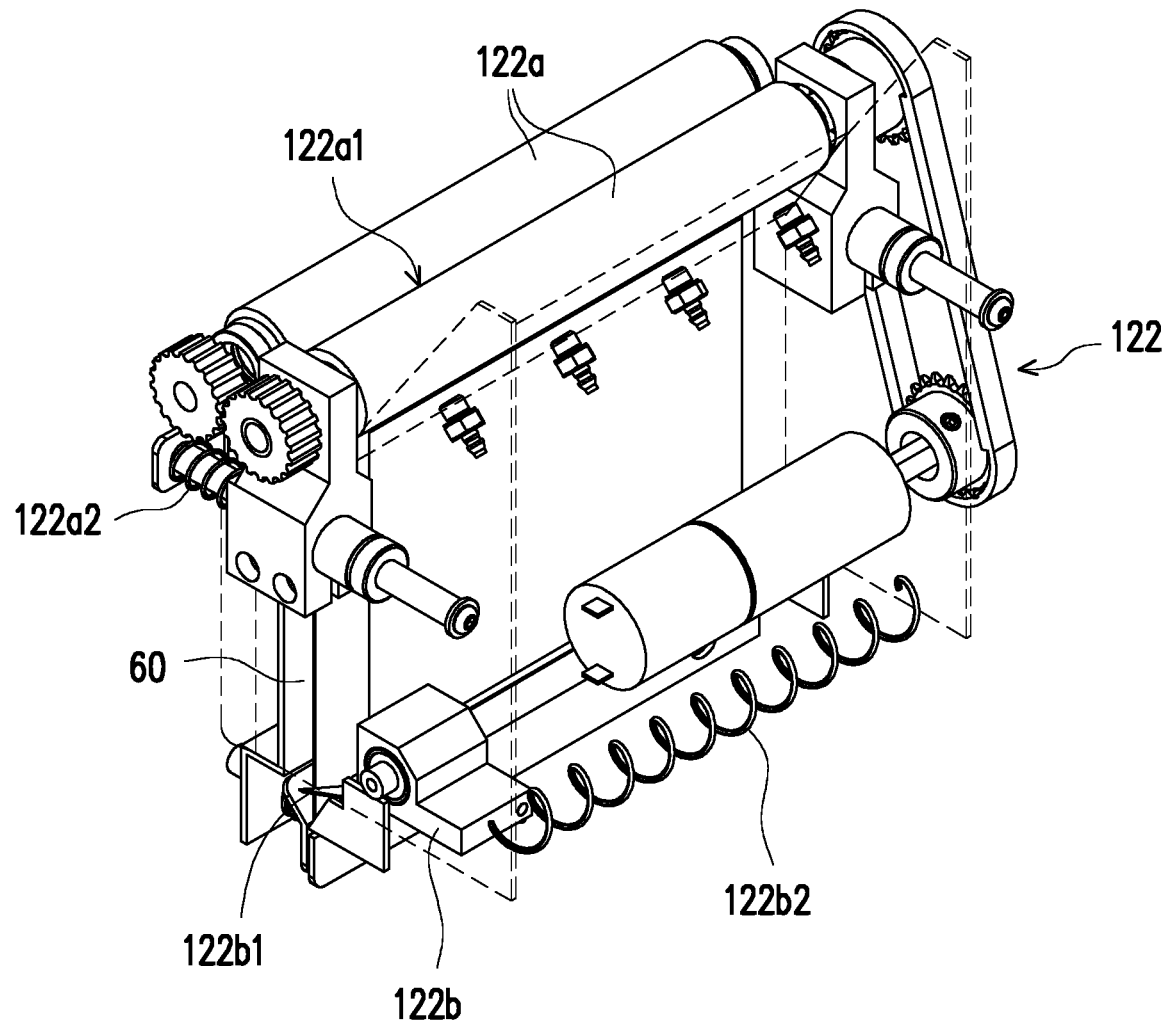
Figure 8C:
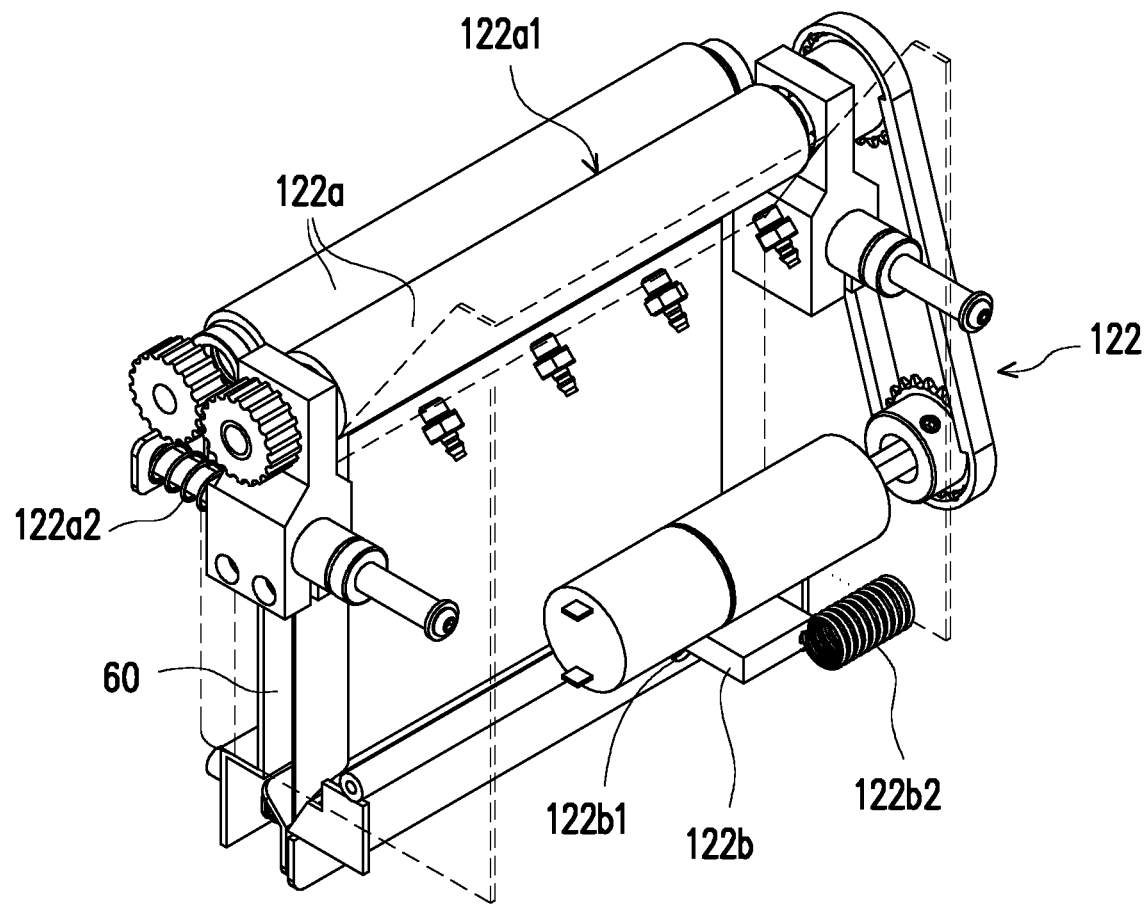

FIG. 8A to FIG. 8C illustrate an operation flow of a part of components of the ingredient providing module of FIG. 2. Referring to FIG. 2, FIG. 8A and FIG. 8C, the ingredient providing module 120 of the embodiment includes a solid ingredient supply unit 122, and the solid ingredient supply unit 122 is adapted to supply a solid ingredient into the beverage cup 50 (illustrated in FIG. 1 and FIG. 2). To be specific, the solid ingredient supply unit 122 includes two rollers 122*a* and an automatic cutting element 122*b*. A gap between the two rollers 122*a* constitutes an ingredient package input port 122*a*1, and the two rollers 122*a* may be separated from each other by an elastic force of a compressed spring 122*a*2, so that the ingredient package input port 122*a*1 becomes larger as shown in FIG. 8A, at this moment, an ingredient package 60 may be moved downward to enter the solid ingredient supply unit 122 through the ingredient package input port 122*a*1. Then, the two rollers 122*a* may be driven by a suitable driving element to resist the elastic force of the compressed spring 122*a*2 to approach each other, so that the ingredient package input port 122*a*1 becomes smaller as shown in FIG. 8B, and is moved upward as the two rollers 122*a* are rolled upward. The rollers 122*a* may be driven by a motor or other suitable driving element, which is not limited by the disclosure. The automatic cutting element 122*b* includes, for example, a blade 122*b*1 and is adapted to be actuated from a state shown in FIG. 8B to a state shown in FIG. 8C by an elastic force of a tension spring 122*b*2, and is adapted to be driven by a suitable driving mechanism to resist the elastic force of the tension spring 122*b*2 to restore from the state shown in FIG. 8C to the state shown in FIG. 8B, such that a lower edge of the ingredient package 60 is cut by the blade 122*b*1, and the solid ingredient may be squeezed out from an opening at the bottom of the ingredient package 60. During an upward moving process of the ingredient package 60 driven by the rollers 122*a* rolling upward, the solid ingredient in the ingredient package 60 is pushed away from the ingredient package 60 by the pressing of the two rollers 122*a*, and falls down into the beverage cup 50 (shown in FIG. 1 and FIG. 2) located below the solid ingredient supply unit 122. The ingredient package 60 moved upward by the rollers 122*a* rolling upward may be guided to a collection tank by a guiding structure for centralization and discarding.

By setting the solid ingredient supply unit 122, the user may manually input various ingredient packages 60 to automatically provide ingredients in the ingredient packages 60 into the beverage cup 50. Thus, the beverage brewing apparatus 100 is unnecessary to be additionally configured with a space for pre-storing the ingredients, which may further reduce the volume of the overall apparatus without reducing selectivity of the drink types due to the limited space for storing the ingredients.

The configuration and function method of the solid ingredient supply unit 122 are not limited by the disclosure, which may be in the form shown in FIG. 8A to FIG. 8C or other forms. Figures are provided below for further description.

Figure 9A:
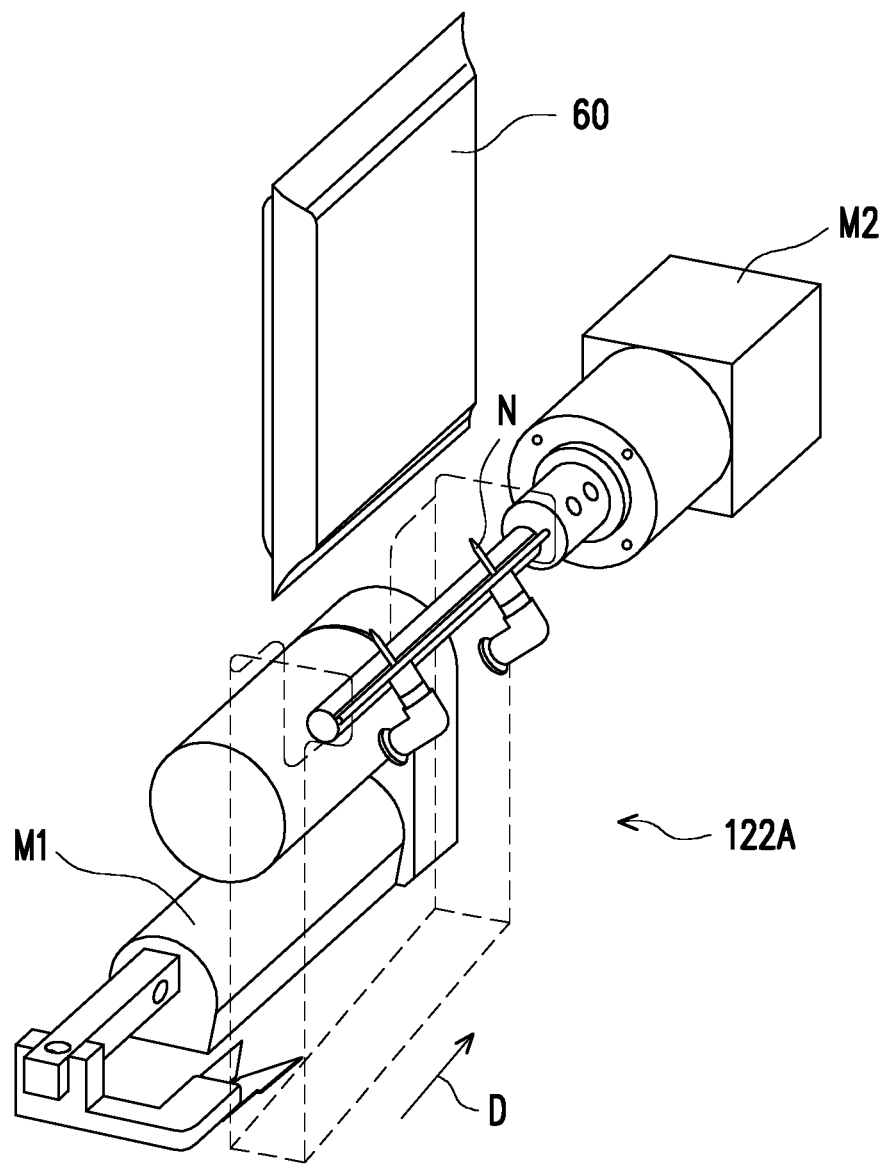
FIG. 9A, FIG. 9B, and FIG. 9C illustrate an operation flow of a solid ingredient supply unit according to another embodiment of the disclosure.
Figure 9B:
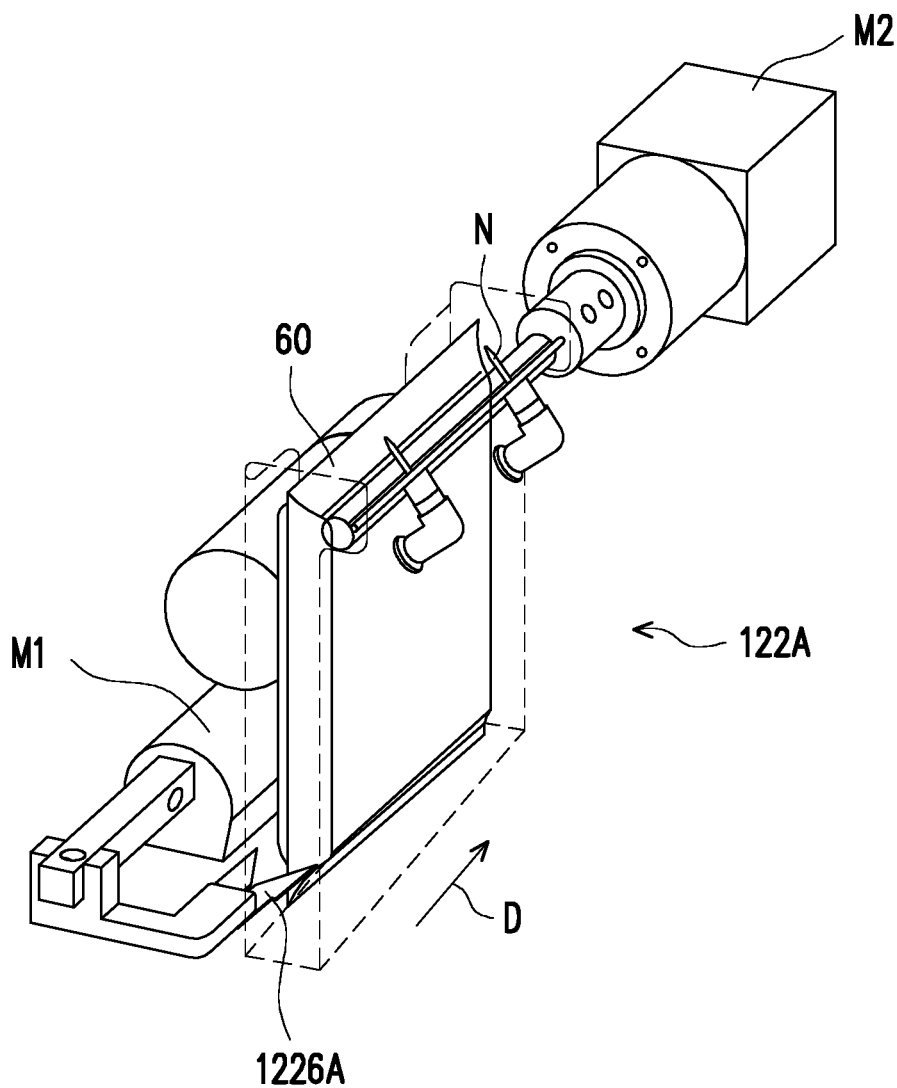
Figure 9C:
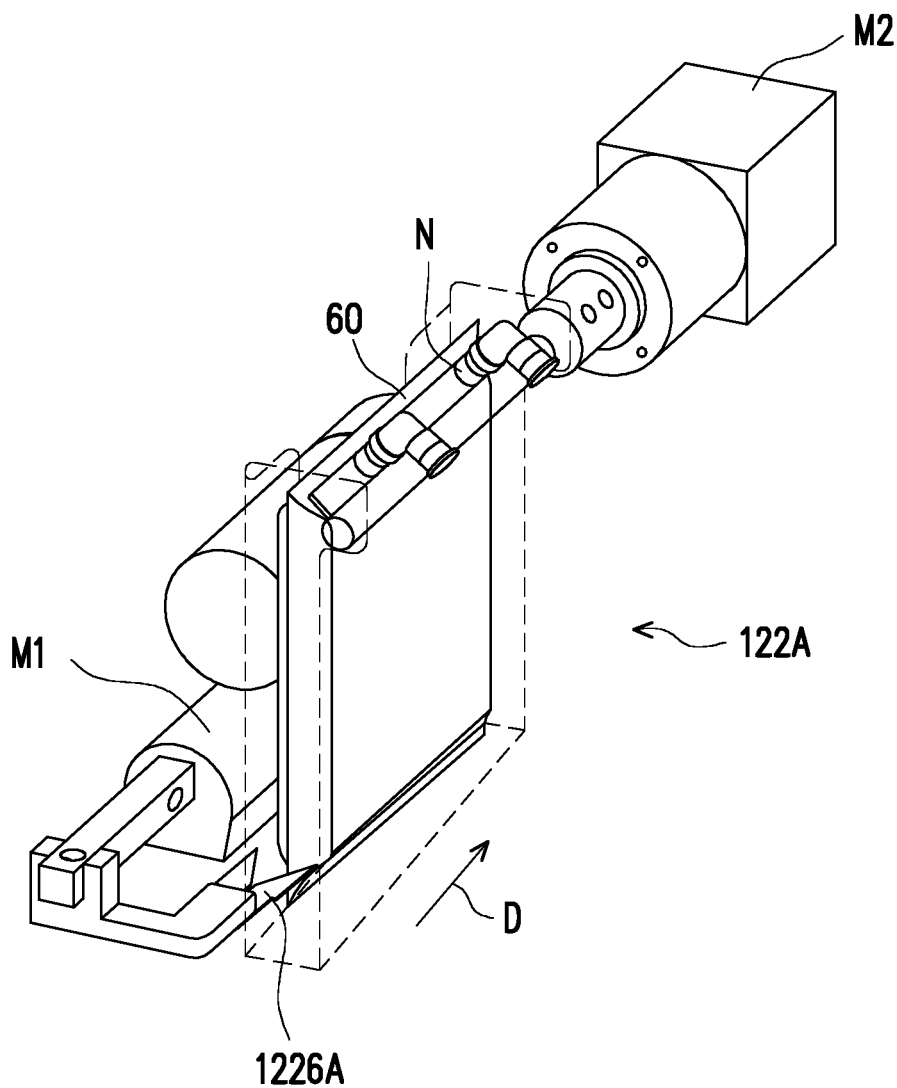

FIG. 9A to FIG. 9C illustrate an operation flow of a solid ingredient supply unit according to another embodiment of the disclosure. A difference between a solid ingredient supply unit 122A shown in FIG. 9A to FIG. 9C and the solid ingredient supply unit 122 shown in FIG. 8A to FIG. 8C is that after the ingredient package 60 is placed into the solid ingredient supply unit 122A as shown in FIG. 9A to FIG. 9B and the blade 122*b*A is driven by a linear motor M1 to move in a direction D to cut the lower edge of the ingredient package 60, a motor M2 of the solid ingredient supply unit 122A is used to drive pointed air nozzles N to rotate and pierce the ingredient package 60 as shown in FIG. 9B to FIG. 9C, and the ingredient package 60 is blown by the pointed air nozzles N to drive the solid ingredient therein to move downward to get out of the ingredient package 60 under air pressure. Then, the ingredient package 60 may be moved to a collection tank by an appropriate gripping mechanism or conveying mechanism for centralization and discarding.

Figure 10:
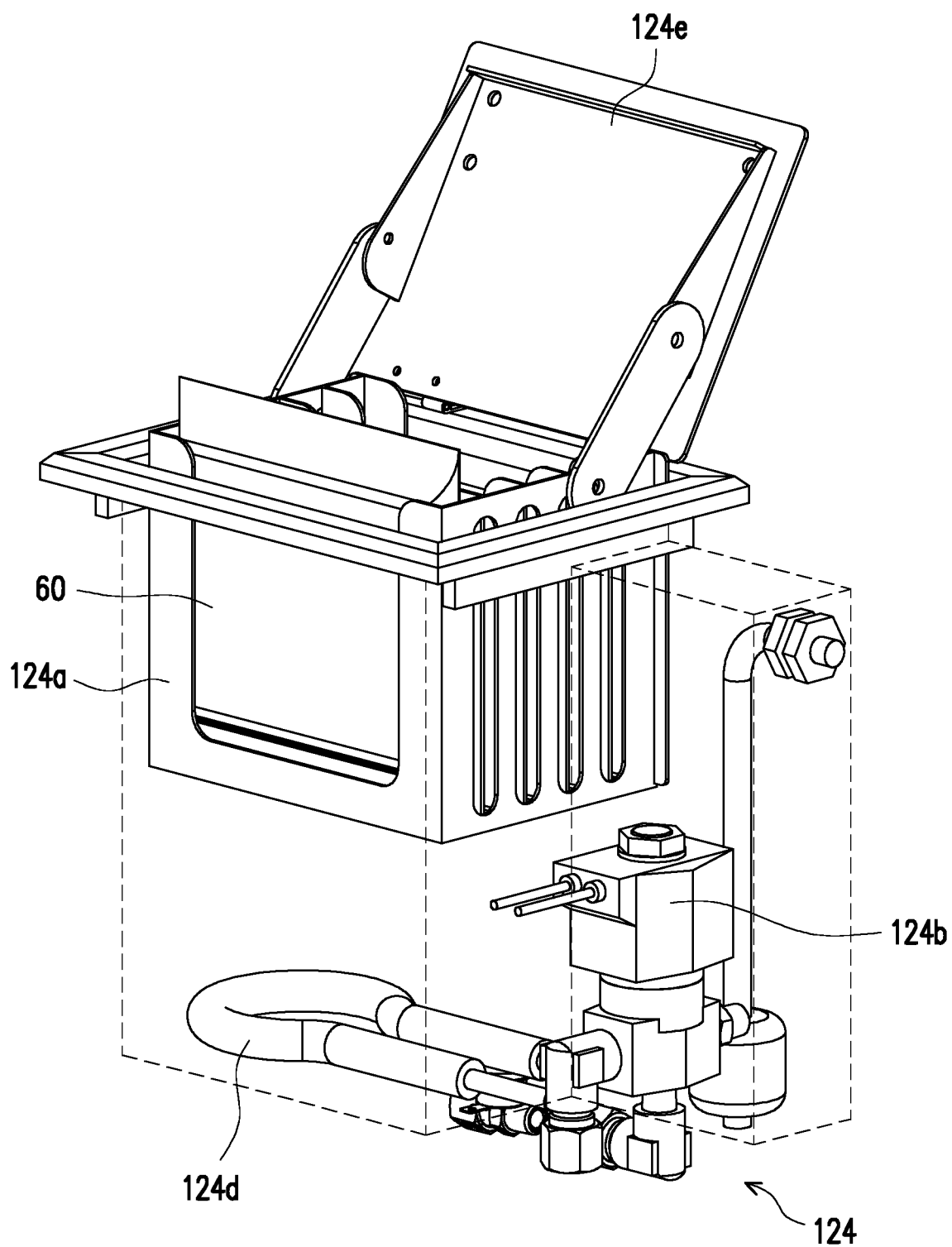
FIG. 10 and FIG. 11 are three-dimensional views of a heat-preserving device of FIG. 1.
Figure 11:
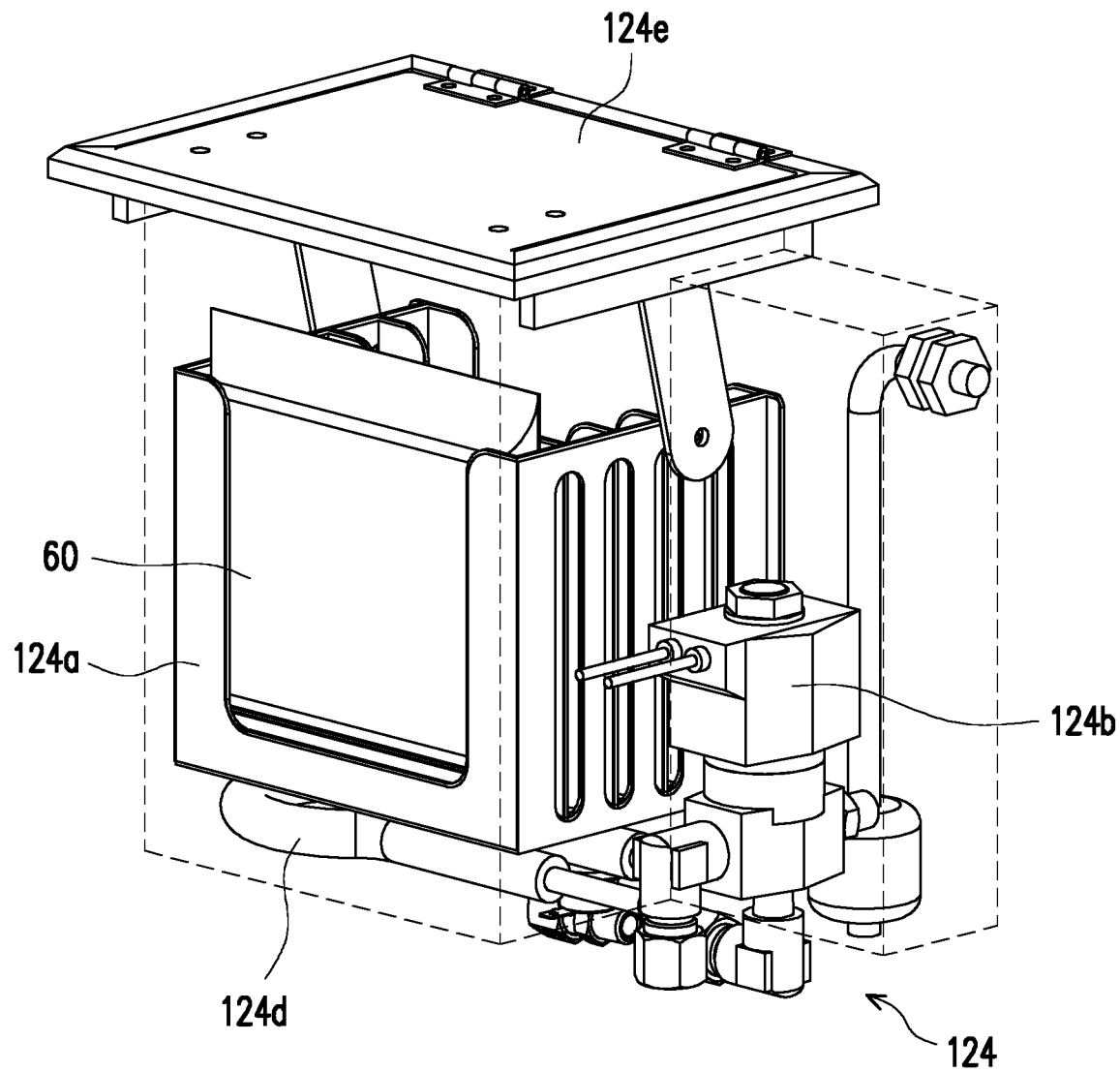

FIG. 10 and FIG. 11 are three-dimensional views of a heat-preserving device 124 of FIG. 1. Referring to FIG. 2, FIG. 10 and FIG. 11, the ingredient providing module 120 may further include the heat-preserving device 124, and the heat-preserving device 124 is provided with a frame body 124*a*, a water inlet valve 124*b*, and a heating pipe 124*d*. The frame body 124*a* in the heat-preserving device 124 is adapted to contain the ingredient package 60, water is adapted to enter the heat-preserving device 124 through the water inlet valve 124*b*, and the heating pipe 124*d* is adapted to heat the water in the heat-preserving device 124 to heat the ingredient package 60 and preserve a temperature thereof. The user may open an upper cover 124*e* of the heat-preserving device 124 as shown in FIG. 10 to drive the frame body 124*a* to rise and place the ingredient package 60 into the frame body 124*a* of the heat-preserving device 124, and then the user may close the upper cover 124*e* as shown in FIG. 11 to heat the ingredient package 60 and preserve the temperature thereof. When the user wants to brew a drink, the user may open the upper cover 124*e* of the heat-preserving device 124 as shown in FIG. 10 to take out the ingredient package 60 in the heat-preserving device 124 and place it in the solid ingredient supply unit 122 shown in FIG. 8A to FIG. 8C (or the solid ingredient supply unit 122A shown in FIG. 9A to FIG. 9C).

Referring to FIG. 1 and FIG. 2, in the embodiment, the beverage brewing apparatus 100 has an opening O and a beverage cup placing and taking-out area R, the opening O is located on the outside of the beverage brewing apparatus 100, the beverage cup placing and taking-out area R is located inside the opening O, and the beverage cup placing and taking-out area R, for example, includes a cup holder H a space above the cup holder H. The user may place the beverage cup 50 to the beverage cup placing and taking-out area R through the opening O, and the brewing module 110 is adapted to brew the ingredient and the drink in the beverage cup 50 at the beverage cup placing and taking-out area R, so that it is convenient for the user to take out the beverage cup 50 containing the brewed beverage from the beverage cup placing and taking-out area R through the opening O. In other embodiments, the beverage cup supply module 160 may be used to place the beverage cups 50 to the beverage cup placing and taking-out area R one by one.

Figure 12A:
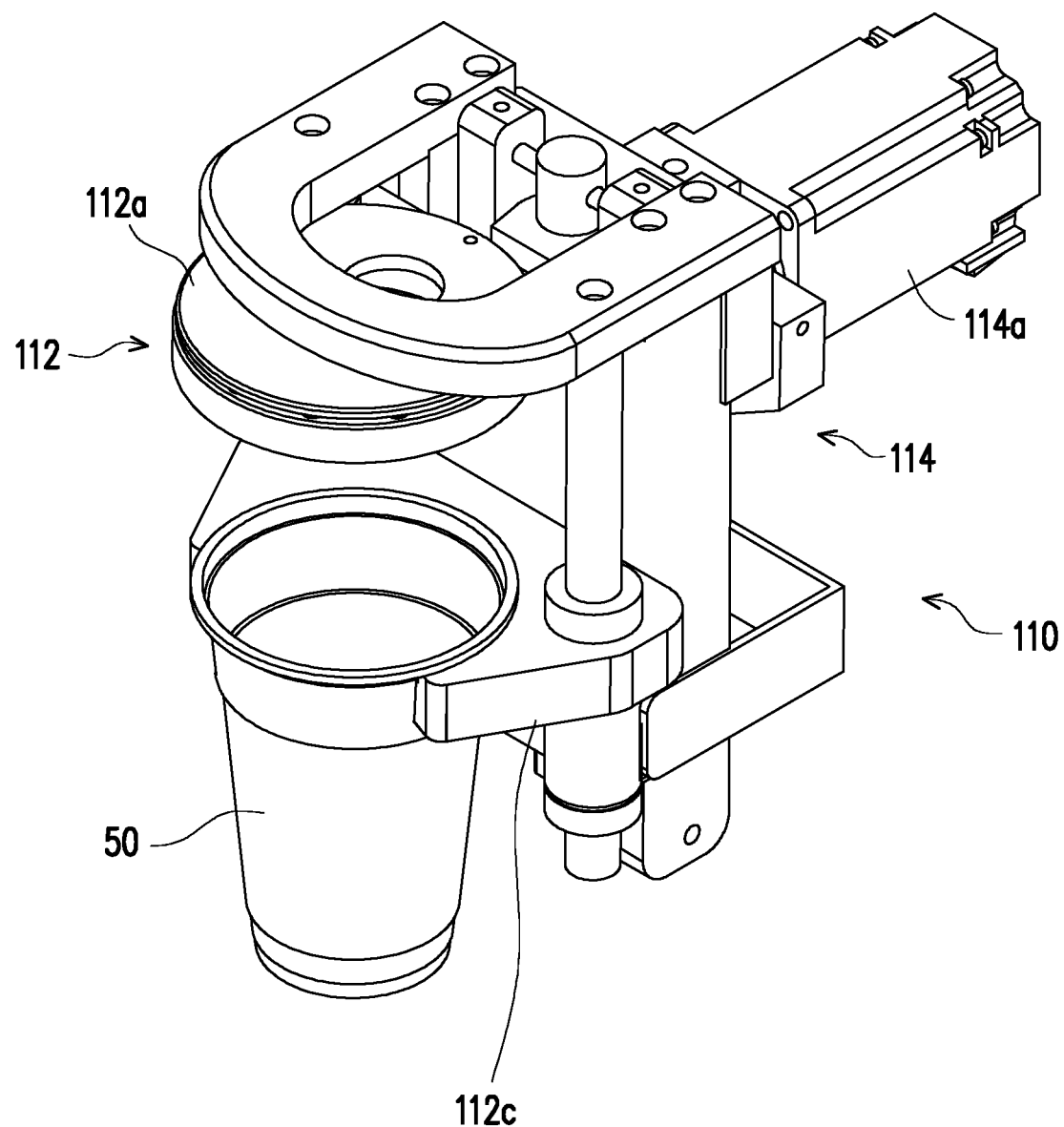
FIG. 12A and FIG. 12B are three-dimensional views of a brewing module of FIG. 2.
Figure 12B:
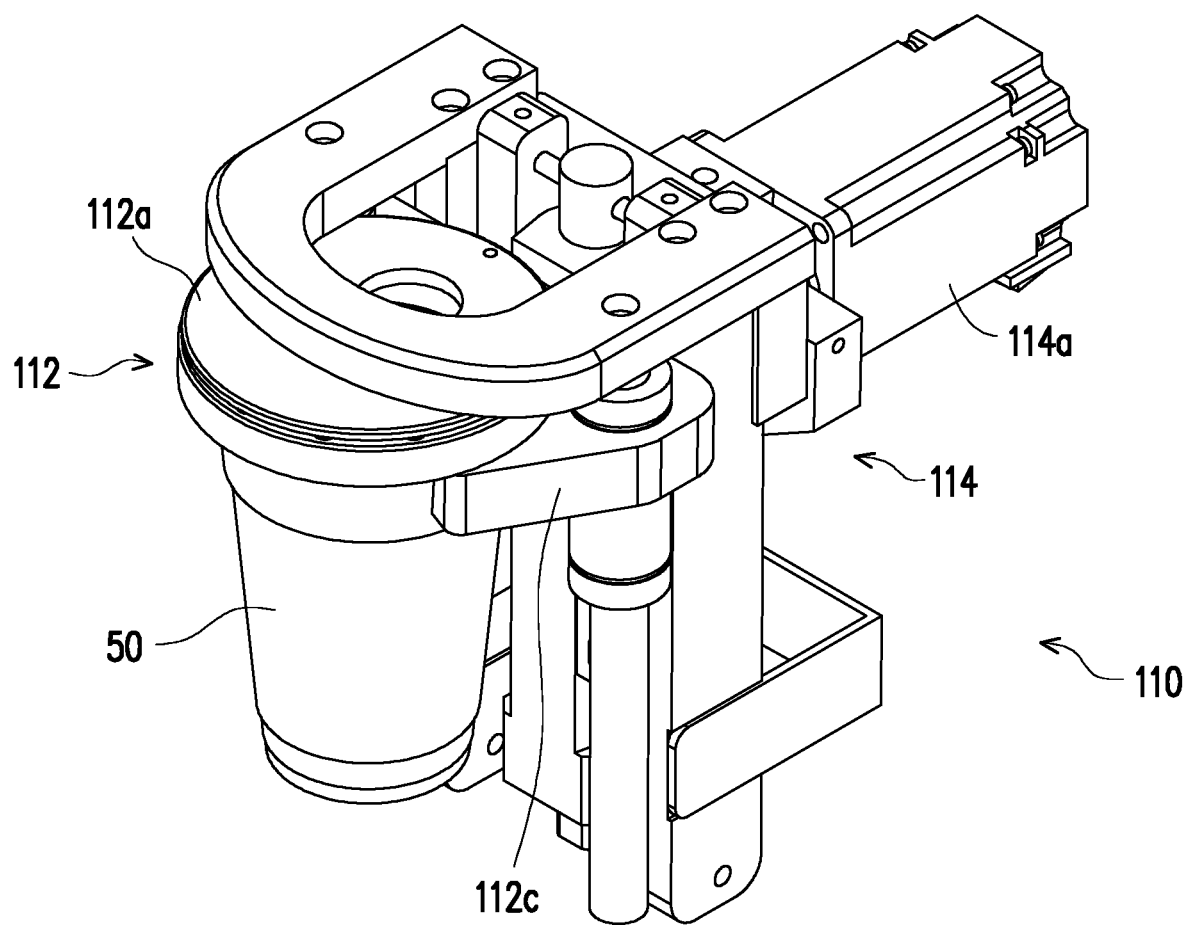
Figure 13:
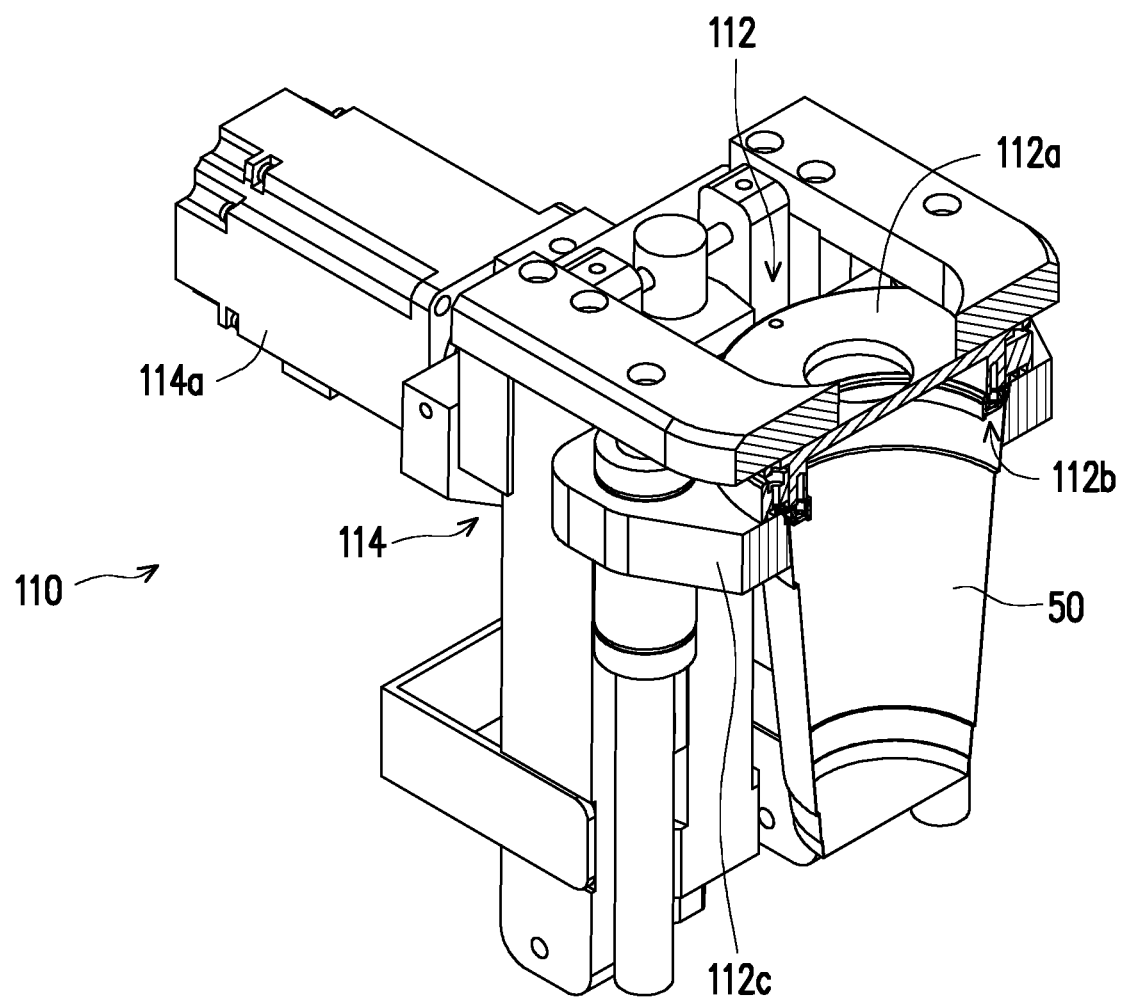
FIG. 13 illustrates a partial structure of the brewing module of FIG. 12B.

FIG. 12A and FIG. 12B are three-dimensional views of the brewing module of FIG. 2. FIG. 13 illustrates a partial structure of the brewing module of FIG. 12B. Referring to FIG. 12A to FIG. 13, further, the brewing module 10 includes a cover device 112 and a shaking mechanism 114 located at the beverage cup placing and taking-out area R (indicated in FIG. 1 and FIG. 2). The cover device 112 includes an upper cover 112*a*, a sealing structure 112*b* (which may include a silicone sealing ring), and a bracket 112*c*. The bracket 112*c* is adapted to hold the beverage cup 50 and drive the beverage cup 50 to rise as shown in FIG. 12A to FIG. 12B, so that an opening of the beverage cup 50 is covered by the upper cover 112*a* as shown in FIG. 12B and FIG. 13, and the sealing structure 112*b* seals the opening of the beverage cup 50. Then, the shaking mechanism 114 connected to the bracket 112*c* is adapted to shake the bracket 112*c* and the beverage cup 50 to brew the ingredient and the drink in the beverage cup 50. The shaking mechanism 114 is, for example, a cam mechanism and is driven by a motor 114a. However, the disclosure is not limited thereto, and various appropriate methods may be adopted to drive the beverage cup 50 to shake.

The sealing method of the opening of the beverage cup 50 is not limited by the disclosure, which is described below with reference to the drawings.

Figure 14A:
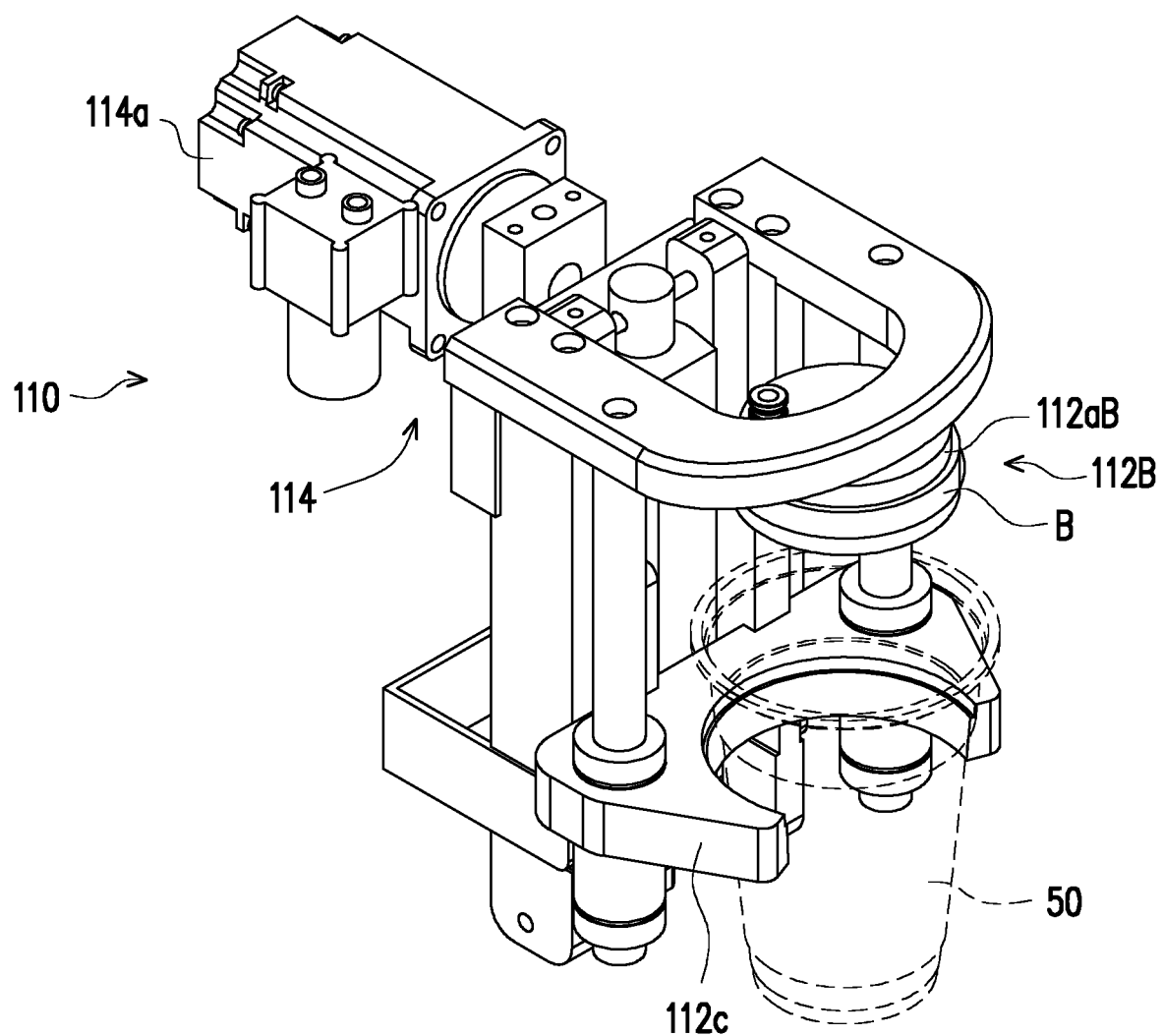
FIG. 14A, FIG. 14B, and FIG. 14C illustrate an operation flow of a cover device according to another embodiment of the disclosure.
Figure 14B:
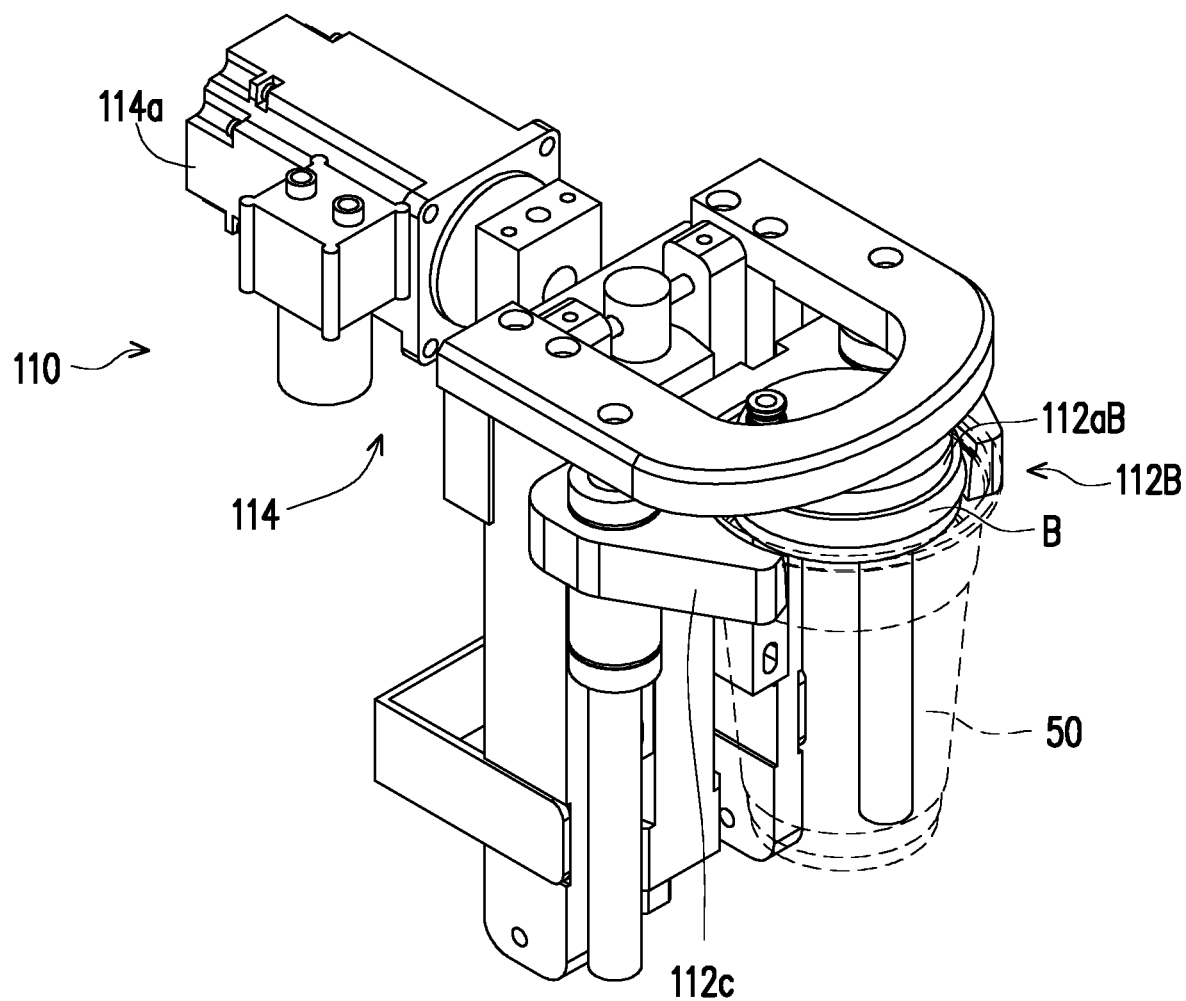
Figure 14C:
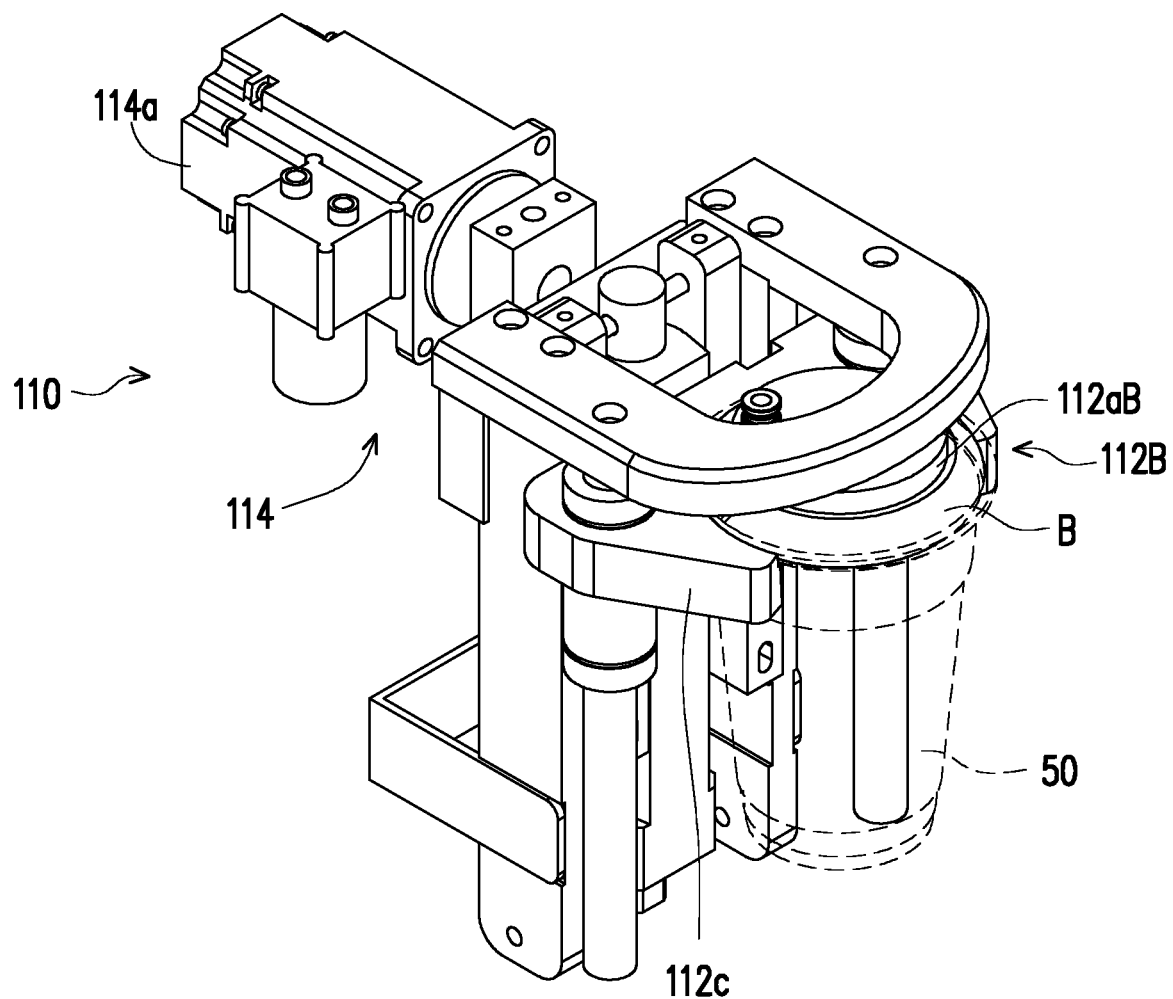

FIG. 14A to FIG. 14C illustrate an operation flow of a cover device according to another embodiment of the disclosure. A difference between a cover device 112B shown in FIG. 14A to FIG. 14C and the cover device 112 shown in FIG. 12A, FIG. 12B and FIG. 13 is that the cover device 112B includes an upper cover 112aB and an airbag B circumferentially disposed around a periphery of the upper cover 112aB. After the beverage cup 50 is driven to rise by the bracket 112c as shown in FIG. 14A to FIG. 14B to make its opening to be located at the cover device 112B as shown in FIG. 14B, the airbag B is inflated to a state shown in FIG. 14C to seal the opening of the beverage cup 50, so as to achieve a function of sealing the beverage cup 50.

Figure 15A:
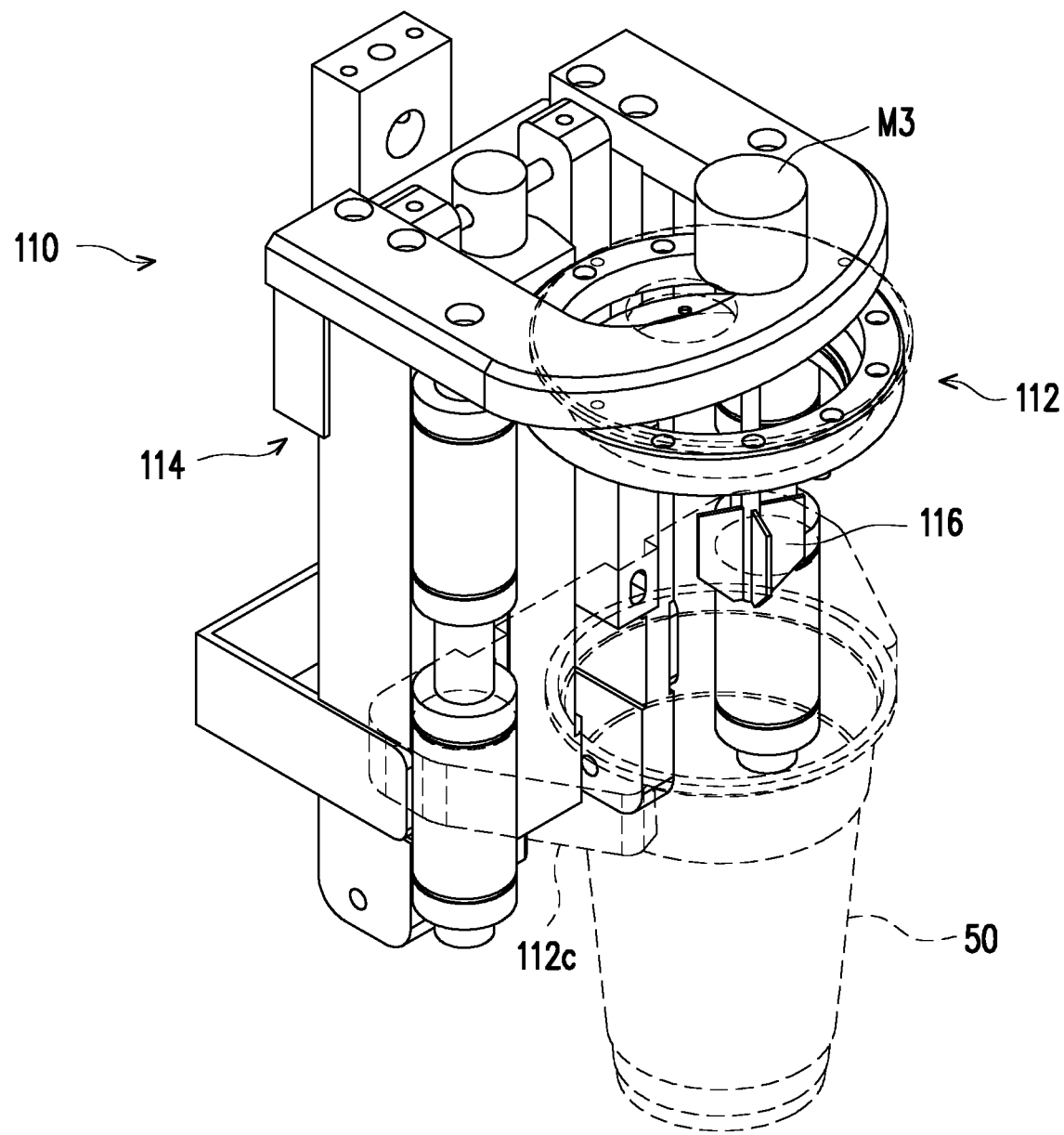
FIG. 15A and FIG. 15B illustrate an operation flow of a stirring device added to a brewing module.
Figure 15B:
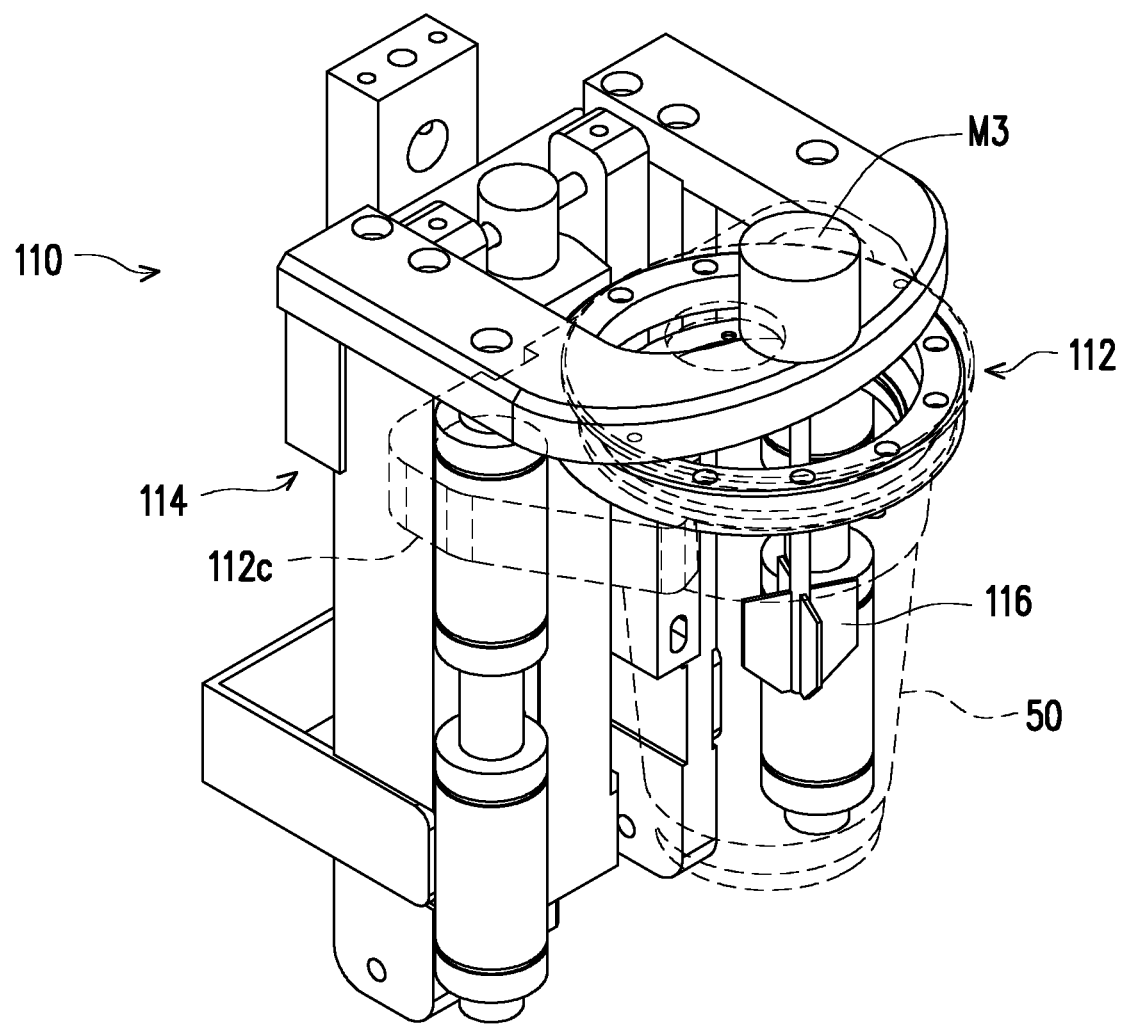

Besides that the brewing module 110 adopts the shaking mechanism 114 shown in FIG. 12A and FIG. 12B to brew beverage in a shaking manner, the brewing module 110 may further brew the beverage in a stirring manner, which is described below with reference to the drawings. Referring to FIG. 15A and FIG. 15B, the brewing module 110 may further include a stirring device 116 located at the beverage cup placing and taking-out area R (shown in FIG. 1 and FIG. 2). When the beverage cup 50 is driven to rise as shown in FIG. 15A to FIG. 15B, and is sealed by the cover device 112, the stirring device 116 is accordingly extended into the beverage cup 50 and may be driven by an appropriate driving element (such as a motor M3) to rotate, so as to stir the ingredient and the drink in the beverage cup 50. In detail, the stirring device 116 is configured in a manner of passing through the cover device 112, and a junction between the stirring device 116 and the cover device 112 is sealed by an elastic sealing material to achieve a seamless effect, so that the stirring device 116 may operate smoothly and maintain a sealed state.

Figure 16:
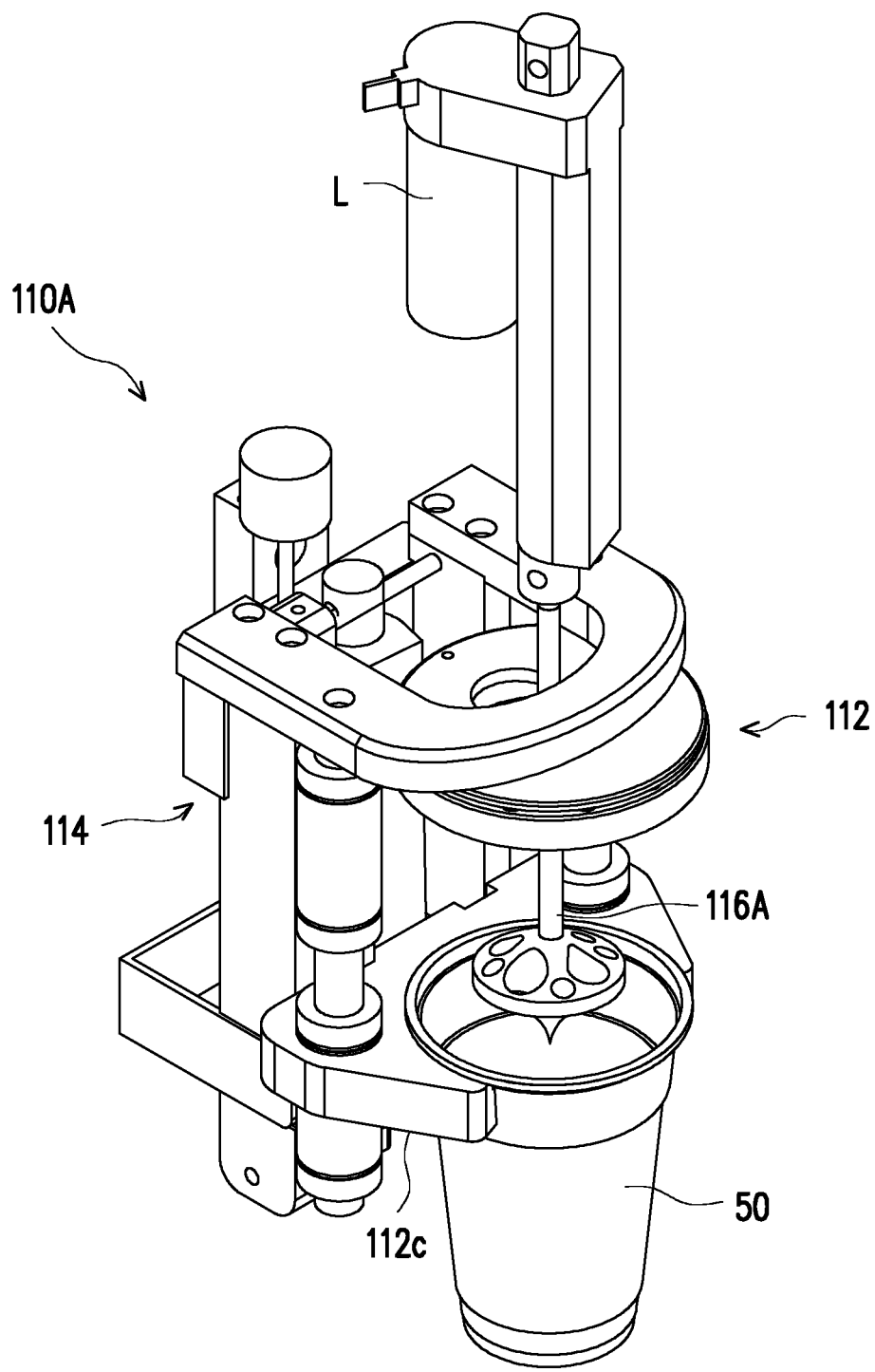
FIG. 16 is a three-dimensional view of a brewing module according to another embodiment of the disclosure.
Figure 17A:
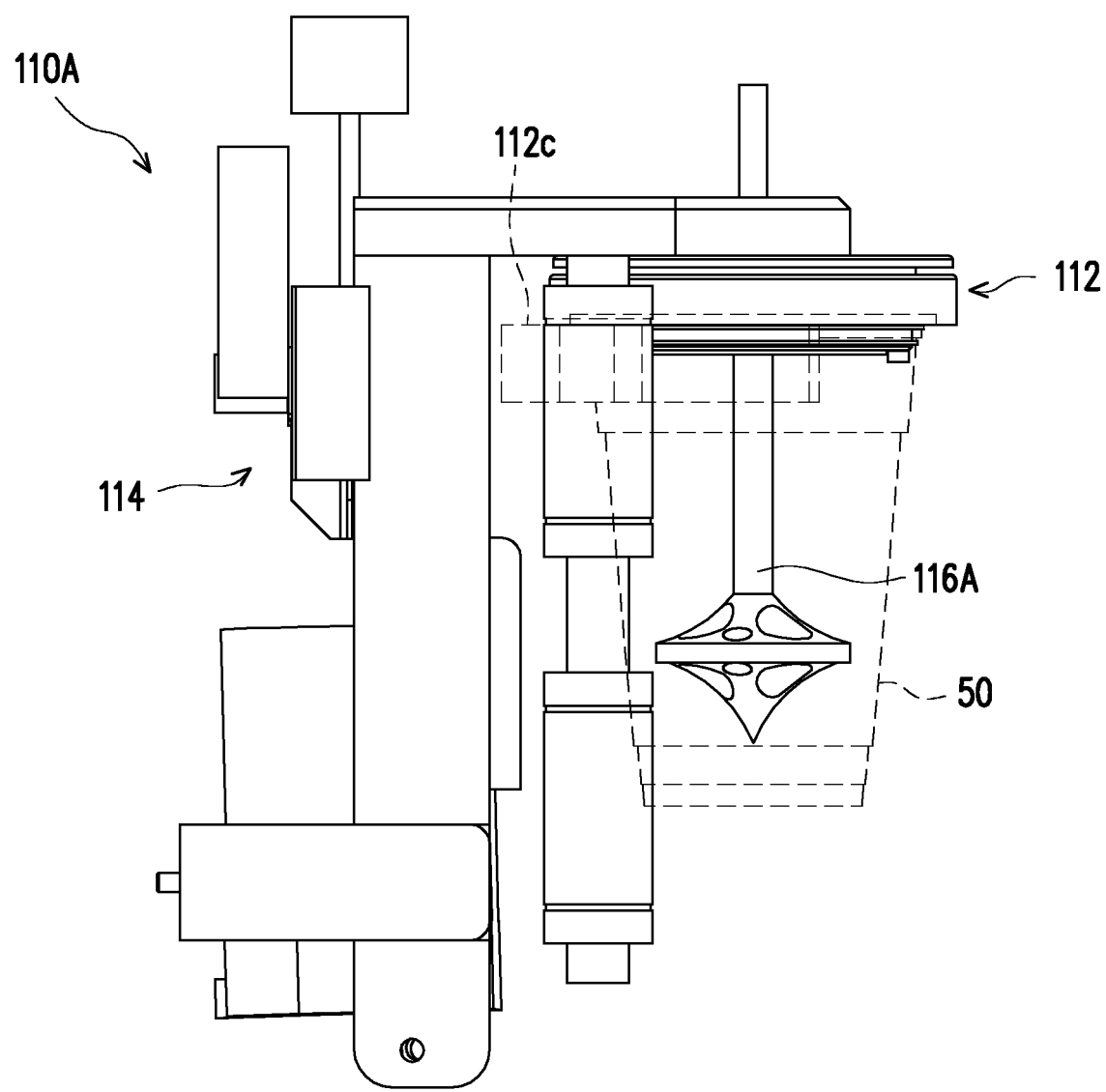
FIG. 17A and FIG. 17B illustrate actuation of a stirring device of FIG. 16.
Figure 17B:
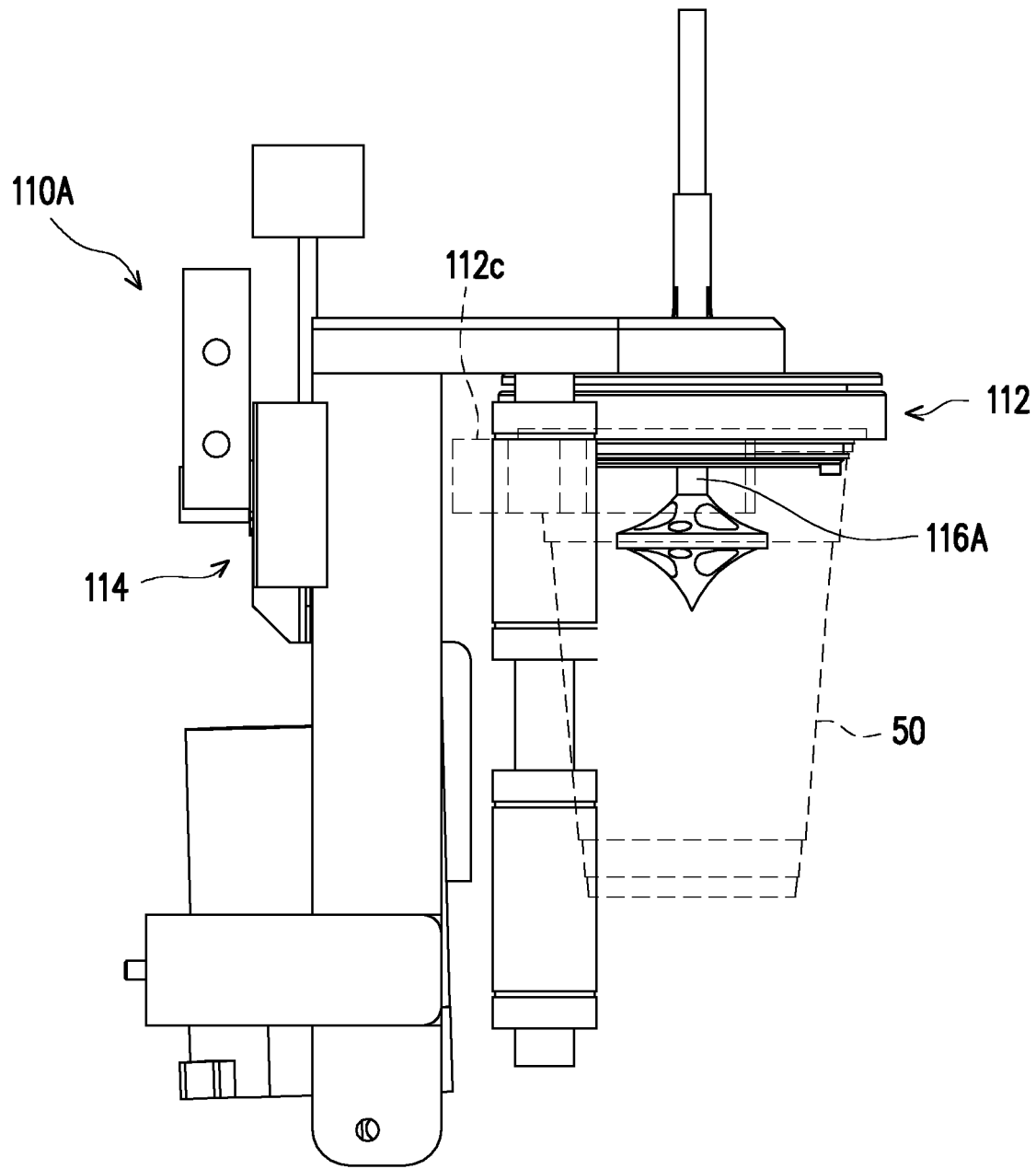

FIG. 16 is a three-dimensional view of a brewing module according to another embodiment of the disclosure. FIG. 17A and FIG. 17B illustrate actuation of a stirring device of FIG. 16. A difference between a brewing module 110A shown in FIG. 16 to FIG. 17B and the brewing module 110 shown in FIG. 15A and FIG. 15B is that a stirring device 116A is driven by a linear brake L to perform stirring in an up-down moving manner as shown in FIG. 17A and FIG. 17B.

In summary, the beverage brewing apparatus of the disclosure directly provides drinks and ingredients into the beverage cup, and directly performs a brewing procedure such as shaking, stirring, etc., on the beverage cup and the drinks and ingredients therein, so that there is no need to additionally set a relay brewing cup and additionally set a mechanism or assembly for transferring the beverage in the brewing cup to the beverage cup, by which the volume of the overall apparatus is reduced to achieve a space saving effect, and the apparatus is more suitable for selling places of various freshly brewed drinks. Moreover, since the beverage brewing apparatus of the disclosure omits the brewing cup and the related mechanism or assembly as described above, a chance of contact of the drinks and the ingredients with the apparatus is greatly reduced, so as to improve the degree of sanitation and make the overall apparatus easy to be cleaned. Moreover, the drink providing module may include the heat source device to extract tea or coffee or other drinks freshly, compared with a pre-stored drink, the freshly extracted drink may have a better flavor, and the beverage brewing apparatus is unnecessary to be additionally configured with a space for pre-storing drinks, so that the volume of the overall apparatus is further reduced without reducing selectivity of drink types due to the limited space for storing the drinks. Moreover, the solid ingredient supply unit is provided for the user to put in various ingredient packages and may automatically provide the ingredients in the ingredient packages into the beverage cup, in this way, it is not necessary for the beverage brewing apparatus to be additionally configured with a space for pre-storing the ingredients, which may further reduce the volume of the overall apparatus without reducing variety of the drink types due to the limited space for storing the ingredients.

What is claimed is:

1. A beverage brewing apparatus, comprising:
    a brewing module, adapted to shake or stir at least one drink and at least one ingredient in a beverage cup;
    an ingredient providing module, adapted to provide the at least one ingredient into the beverage cup;
    a drink providing module, adapted to provide the at least one drink into the beverage cup;
    a control unit, adapted to control the brewing module, the ingredient providing module and the drink providing module according to a brewing procedure corresponding to the at least one drink and the at least one ingredient;
    an opening, located on an outside of the beverage brewing apparatus; and
    a beverage cup placing and taking-out area, corresponding to the opening, wherein the brewing module is adapted to shake or stir the at least one ingredient and the at least one drink in the beverage cup at the beverage cup placing and taking-out area, the beverage cup is adapted to be taken out from the beverage cup placing and taking-out area through the opening, and the beverage cup is adapted to be placed to the beverage cup placing and taking-out area through the opening.

2. The beverage brewing apparatus as claimed in claim 1, wherein the drink providing module comprises a heat source device and an extraction space, the extraction space is adapted to contain at least one drink raw material, and the heat source device is adapted to provide hot water, steam or both of hot water and steam to extract the at least one drink raw material in the extraction space into the at least one drink.

3. The beverage brewing apparatus as claimed in claim 2, wherein the at least one drink extracted from the at least one drink raw material comprises at least one of tea and coffee.

4. The beverage brewing apparatus as claimed in claim 2, wherein the drink providing module comprises a drink raw material input port, the drink raw material input port is located on an outside of the beverage brewing apparatus, and the at least one drink raw material is adapted to be put into the extraction space through the drink raw material input port.

5. The beverage brewing apparatus as claimed in claim 2, wherein the drink providing module comprises at least one drink raw material container and an automatic supply element, the drink raw material container is adapted to contain the at least one drink raw material, and the automatic supply element is adapted to supply the at least one drink raw material in the drink raw material container to the extraction space in a quantitative and separate manner.

6. The beverage brewing apparatus as claimed in claim 1, wherein the drink providing module comprises at least one drink storage container, and the at least one drink storage container is adapted to store the at least one drink.

7. The beverage brewing apparatus as claimed in claim 1, wherein the at least one ingredient comprises at least one solid ingredient, the ingredient providing module comprises at least one solid ingredient supply unit, and the at least one solid ingredient supply unit is adapted to supply the at least one solid ingredient into the beverage cup.

8. The beverage brewing apparatus as claimed in claim 7, wherein the solid ingredient supply unit comprises an ingredient package input port and an automatic cutting element, an ingredient package is adapted to be put into the solid ingredient supply unit through the ingredient package input port, and the automatic cutting element is adapted to cut the ingredient package so that the at least one solid ingredient in the ingredient package is adapted to be moved from the ingredient package to the beverage cup.

9. The beverage brewing apparatus as claimed in claim 7, wherein the ingredient providing module comprises a heat-preserving device, the heat-preserving device is adapted to contain a plurality of ingredient packages, and each of the ingredient packages contains the at least one solid ingredient.

10. The beverage brewing apparatus as claimed in claim 1, further comprising a beverage cup supply module, wherein the beverage cup supply module is adapted to load a plurality of the beverage cups, and adapted to move the beverage cups to the brewing module one by one.

11. The beverage brewing apparatus as claimed in claim 1, further comprising a cleaning module, wherein the cleaning module is adapted to clean the brewing module and the ingredient providing module through at least one of hot water, steam and disinfectant.

12. The beverage brewing apparatus as claimed in claim 1, further comprising a beverage cup supply module, wherein the beverage cup supply module is adapted to load a plurality of the beverage cups, and adapted to move the beverage cups to the beverage cup placing and taking-out area one by one.

13. The beverage brewing apparatus as claimed in claim 1, wherein the brewing module comprises a cover device and a shaking mechanism located at the beverage cup placing and taking-out area, the cover device is adapted to cover an opening of the beverage cup, and the shaking mechanism is adapted to shake the beverage cup.

14. The beverage brewing apparatus as claimed in claim 1, wherein the brewing module comprises a stirring device located at the beverage cup placing and taking-out area, and the stirring device is adapted to be extended into the beverage cup and stir the at least one ingredient and the at least one drink in the beverage cup.

* * * * *